US012798185B2

(12) United States Patent
Sherlock et al.

(10) Patent No.: US 12,798,185 B2
(45) **Date of Patent: *Nov. 17, 2026**

(54) LIQUEFIER NOZZLE FOR AN ADDITIVE MANUFACTURING SYSTEM

(71) Applicant: E3D-Online Limited, Chalgrove (GB)

(72) Inventors: Mike Sherlock, Chalgrove (GB); Dylan Roberts, Chalgrove (GB); Rory Yonge, Chalgrove (GB); Sam Theobold, Chalgrove (GB); Andy Everitt, Chalgrove (GB); John Connor LeClaire, Chalgrove (GB)

(73) Assignee: E3D-Online Limited, Chalgrove (GB)

( * ) Notice: Subject to any disclaimer, the term of this patent is extended or adjusted under 35 U.S.C. 154(b) by 264 days.

This patent is subject to a terminal disclaimer.

(21) Appl. No.: 18/560,751

(22) PCT Filed: May 17, 2022

(86) PCT No.: PCT/GB2022/051231

§ 371 (c)(1),
(2) Date: Nov. 14, 2023

(87) PCT Pub. No.: WO2022/243665

PCT Pub. Date: Nov. 24, 2022

(65) Prior Publication Data

US 2024/0253305 A1 Aug. 1, 2024

(30) Foreign Application Priority Data

May 19, 2021 (GB) ..................................... 2107196
Sep. 27, 2021 (GB) ..................................... 2113799
Apr. 1, 2022 (GB) ..................................... 2204825

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/295* (2017.08); *B33Y 30/00* (2014.12); *B29C 64/118* (2017.08)

(58) Field of Classification Search
CPC ... B29C 64/209; B29C 64/295; B29C 64/118; B33Y 30/00
See application file for complete search history.

(56) References Cited

U.S. PATENT DOCUMENTS 5,005,731 A 4/1991 Koehler et al.
5,121,329 A * 6/1992 Crump .................. B33Y 30/00 228/180.5

(Continued)

FOREIGN PATENT DOCUMENTS

CN 203485448 U 3/2014
CN 204773647 U 11/2015

(Continued)

OTHER PUBLICATIONS

International Search Report and Written Opinion mailed Oct. 4, 2022 for International Application No. PCT/GB2022/051231.

(Continued)

*Primary Examiner* — Galen H Hauth
*Assistant Examiner* — Mohamed K Ahmed Ali
(74) *Attorney, Agent, or Firm* — Wolf, Greenfield & Sacks, P.C.

(57) ABSTRACT

The invention relates to a liquefier nozzle (100) for an additive manufacturing system, which includes a body (110, 111,112) within which is received one or more inserts. One type of insert is a wear resistant tip insert (106) press-fit into the body. Another type is a heat transfer insert (10) either press-fit into an upstream end of the body or captivated
(Continued)

within the body by the wear resistant tip insert (106). Yet another type is a press-fit tip insert that incorporates a heat transfer element.

20 Claims, 11 Drawing Sheets

(51) Int. Cl.

| | |
|---|---|
| ***B29C 64/295*** | (2017.01) |
| ***B33Y 30/00*** | (2015.01) |

(56) References Cited

U.S. PATENT DOCUMENTS

| | | | |
|---|---|---|---|
| 5,340,433 | A | 8/1994 | Crump |
| 6,054,077 | A | 4/2000 | Comb et al. |
| 12,496,778 | B2 * | 12/2025 | Sherlock ............... B29C 64/118 |
| 2014/0159284 | A1 | 6/2014 | Leavitt |
| 2015/0096717 | A1 | 4/2015 | Batchelder et al. |
| 2015/0224699 | A1 | 8/2015 | Larsen et al. |
| 2016/0046073 | A1 | 2/2016 | Hadas |
| 2016/0067920 | A1 | 3/2016 | Fontaine |
| 2016/0236408 | A1 | 8/2016 | Wolf et al. |
| 2017/0094726 | A1 | 3/2017 | Elserman et al. |
| 2017/0232674 | A1 | 8/2017 | Mark |
| 2017/0291363 | A1 * | 10/2017 | Huang .................. B29C 64/118 |
| 2017/0348911 | A1 | 12/2017 | Bruggeman et al. |
| 2018/0027615 | A1 | 1/2018 | Rios et al. |
| 2018/0147773 | A1 | 5/2018 | Kalyanaraman et al. |
| 2019/0118465 | A1 | 4/2019 | Breck |
| 2020/0079014 | A1 | 3/2020 | Migliori et al. |
| 2020/0189187 | A1 * | 6/2020 | Streicher ................. B29C 64/20 |
| 2020/0223129 | A1 | 7/2020 | Gallé |
| 2021/0394442 | A1 | 12/2021 | Speelman et al. |
| 2023/0150196 | A1 | 5/2023 | Mortimer et al. |
| 2024/0227293 | A1 | 7/2024 | Mortimer et al. |
| 2025/0083384 | A1 | 3/2025 | Sherlock et al. |

FOREIGN PATENT DOCUMENTS

| | | | |
|---|---|---|---|
| CN | 106064477 | B | 5/2017 |
| CN | 207825470 | U | 9/2018 |
| CN | 208615313 | U | 3/2019 |
| CN | 109 874 326 | A | 6/2019 |
| CN | 209 289 757 | U | 8/2019 |
| CN | 110481025 | A | 11/2019 |
| CN | 110561743 | A | 12/2019 |
| CN | 211542386 | U | 9/2020 |
| CN | 212446326 | U | 2/2021 |
| EP | 3 632 682 | A1 | 4/2018 |
| FR | 3 063 451 | A1 | 9/2018 |
| GB | 492642 | A | 9/1938 |
| GB | 695428 | A | 8/1953 |
| GB | 842692 | A | 7/1960 |
| GB | 2 601 021 | A | 5/2022 |
| GB | 2606780 | A | 11/2022 |
| JP | 2008-120030 | A | 5/2008 |
| KR | 10-1872718 | B1 | 6/2018 |
| KR | 10-2020-0052443 | A | 5/2020 |
| PL | 229 370 | B1 | 7/2018 |
| WO | WO 2016/077473 | A1 | 5/2016 |
| WO | WO 2017/008789 | A1 | 1/2017 |
| WO | WO 2017/181060 | A1 | 10/2017 |
| WO | WO 2018/026909 | A1 | 2/2018 |
| WO | WO 2020/239165 | A1 | 12/2020 |

OTHER PUBLICATIONS

International Preliminary Report on Patentability mailed Nov. 30, 2023 for International Application No. PCT/GB2022/051231.

* cited by examiner

LIQUEFIER NOZZLE FOR AN ADDITIVE MANUFACTURING SYSTEM

RELATED APPLICATIONS

This Application is a national stage filing under 35 U.S.C. § 371 of International Patent Application Serial No. PCT/GB2022/051231, filed May 17, 2022, which claims priority to GB application number 2204825.0, filed Apr. 1, 2022, GB application number 2113799.7, filed Sep. 27, 2021, and GB application number 2107196.4, filed May 19, 2021. The entire contents of these applications are incorporated herein by reference in their entirety.

This invention relates generally to additive manufacturing systems for producing three-dimensional (3D) parts and particularly to nozzles for such systems. More specifically, although not exclusively, this invention relates to such a liquefier nozzle with multiple parts, a liquefier assembly and additive manufacturing system including such a nozzle and a method of heating a build material advancing through such a nozzle.

Additive manufacturing, also called 3D printing, is a process in which a part is made by adding material, rather than subtracting material as in traditional machining. A part is manufactured from a digital model using an additive manufacturing system, commonly referred to as a 3D printer. A typical approach is to slice the digital model into a series of layers, which are used to create two-dimensional path data, and to transmit the data to a 3D printer which manufactures the part in an additive build style. There several different methods of depositing the layers, such as stereolithography, ink jetting, selective laser sintering, powder/binder jetting, electron-beam melting and material extrusion.

In a typical extrusion-based additive manufacturing system, such as a fused deposition modelling system, a part may be formed by extruding a viscous, molten thermoplastic material from a distribution head along predetermined paths at a controlled rate. The head includes a liquefier, which receives thermoplastic material, normally in the form of a filament. A drive mechanism engages the filament and feeds it into the liquefier. The filament is fed through the liquefier, where it melts to produce the flow of molten material, and into a nozzle for depositing the molten material onto a substrate. The molten material is deposited along the predetermined paths onto the substrate, where it fuses to previously deposited material and solidifies as it cools, gradually building the part in layers.

Typically, the flow path through the nozzle has a cross-section that matches substantially that of the filament received with it. Such nozzles taper toward the outlet, and the filament is urged against the tapered surface and braces against the sides of the flow path toward the outlet. As a result, the majority of the heat transferred into the filament is often introduced toward the outlet of the nozzle.

It is known to provide liquefier assemblies for extrusion-based additive manufacturing systems, in which the nozzle includes a wear-resistant insert. For example, US 2017/232674 A1 discloses a liquefier nozzle including a thermally conductive body with a throat and tip having a predetermined hardness.

This invention seeks to provide an improved liquefier nozzle, preferably one that mitigates one or more issues associated with known designs.

Accordingly, a first aspect of the invention provides a liquefier nozzle for an additive manufacturing system, the nozzle comprising a body formed of a first material and an insert formed of a second material, wherein the insert is received, for example releasably received, within the body.

The provision of an insert that is able to be separated from the body enables multiple materials to be used, without compromising on the recyclability of the nozzle.

The first material may be thermally conductive, for example more thermally conductive than the second material. The second material may be wear resistant, for example more wear resistant than the first material. The coefficient of thermal expansion of the first material may be more, for example at least 20% more or at least 30% more, than that of the second material. The coefficient of thermal expansion of the first material may be between 20%-50% more, such as 30%-40% more, than that of the second material.

The insert may be press-fit into an interference engagement within the body. This enables a simple, yet effective means of securing the insert within the body, with the added benefit of enabling the insert to be separated more readily from the body. Alternatively, the insert may be secured to or within the body by some other means, for example it may be welded, soldered or brazed. In some embodiments, the insert may be secured by mechanical means. The insert may be threadedly connected or mounted to or within the body, or connected to or within the body by a bayonet, snap fit or any other mechanical means.

The body may have a connecting feature, which may be at or adjacent a first, upstream end of the body, e.g. for connecting the nozzle to a heater of a liquefier assembly. The body may have a receptacle, which may extend from a second, downstream end of the body. The body may have a filament passageway, which may extend from the first end of the body, for example to the receptacle. The filament passageway may have a smaller diameter than the receptacle.

The insert may comprise a wear resistant insert. The insert may have a filament passageway, which may extend from an upstream end of the insert. The insert may have an outlet, which may be at a downstream end of the insert. The outlet may have a smaller diameter than the filament passageway of the insert. The insert may have a transition, which be tapered or conical and/or which may join the filament passageway to the outlet. The insert may be press-fit into an interference engagement within the receptacle of the body.

Another aspect of the invention provides a liquefier nozzle for an additive manufacturing system, the nozzle comprising a body formed of a first, thermally conductive material and an insert formed of a second, wear resistant material, the body having a connecting feature at or adjacent a first, upstream end of the body for connecting the nozzle to a heater of a liquefier assembly, a receptacle extending from a second, downstream end of the body and a filament passageway extending from the first end of the body to the receptacle and having a smaller diameter than the receptacle, the insert having a filament passageway extending from an upstream end of the insert, an outlet at a downstream end of the insert, which has a smaller diameter than the filament passageway of the insert, and a tapered or conical transition joining the filament passageway to the outlet, wherein the insert is press-fit into an interference engagement within the receptacle of the body.

The interference engagement between the insert and the body may comprise, provide or be able to withstand a push-out force of at least 80 N, preferably at least 100 N, more preferably at least 120 N and most preferably at least 150 N, e.g. when the temperature of the nozzle is 300°C or 350° C. However, it is preferable that the nozzle comprises, provides or is able to withstand these push-out forces (i.e. at least 80 N, preferably at least 100 N, more preferably at least 120 N and most preferably at least 150 N) when the nozzle temperature is 400° C. or even 450° C.

The first material preferably has a yield strength of at least 250 MPa, preferably at least 300 MPa and more preferably at least 350 MPa. The first material may have a thermal conductivity that is higher than that of the second material. The first material may have a thermal conductivity of at least 100 W/m K, preferably at least 150 W/m K, more preferably at least 200 W/m K, yet more preferably at least 300 W/m K. The first material may have a coefficient of thermal expansion of at least 10 μm/m K, preferably at least 13 μm/m K and more preferably at least 15 μm/m K.

The first material may comprise copper. The first material is preferably a copper alloy, such as chromium zirconium copper. The first material or its composition may comprise mainly copper, for example at least 95% copper, preferably at least 97% copper, for example at least 98% copper. The first material or its composition may comprise up to 2.0% chromium, such as up to 1.5% chromium, for example between 0.5%-1.5% chromium. The first material or its composition may comprise up to 0.30% zirconium, such as up to 0.25% zirconium, for example between 0.05%-0.25% zirconium. The balance of the composition of the first material may be copper, e.g. with the exception of impurities. The applicants have found that such an alloy composition provides a synergistic balance between strength, to provide the requisite push-out force, and thermal conductivity.

The second material may comprise steel. The steel is preferably a machinable steel. The steel is preferably more machinable than tool steel. The second material may have a hardness of at least 40 HRC, preferably at least 50 HRC and most preferably at least 60 HRC. The second material may have a thermal conductivity of between 40 W/m K and 50 W/m K.

The second material or its composition may comprise 3.0% chromium or less, preferably 2.0% or less. For example, the second material or its composition may comprise or consist of 1.00%-1.60% chromium. The second material or its composition may comprise or consist of 0.20% vanadium or less, preferably 0.10% or less. For example, the second material or its composition may comprise or consist of 0.05% vanadium or less. The second material or its composition may comprise or consist of 0.50% molybdenum or less, preferably 0.20% or less. For example, the second material or its composition may comprise or consist of 0.15% molybdenum or less. The second material may be, or have a composition that is, substantially free of Tungsten, e.g. with the exception of impurities.

The second material or its composition may comprise or consist of 1.50% carbon or less, preferably 0.90%-1.20% carbon. The second material or its composition may comprise or consist of 0.40% silicon or less, preferably 0.10%-0.35% silicon. The second material or its composition may comprise or consist of 1.00% manganese or less, preferably 0.30%-0.75% manganese. The second material or its composition may comprise or consist of up to 0.10% of sulphur, preferably up to 0.05% of sulphur. The second material or its composition may comprise or consist of up to 0.1% phosphorus, preferably up to 0.05% phosphorus. The second material or its composition may comprise or consist of up to 1.00% nickel, preferably up to 0.40% nickel.

The nozzle or body may comprise one or more heat transfer elements. The heat transfer element(s) may project into the filament passageway or a flow path.

Accordingly, a first aspect of the invention provides a nozzle for an extrusion-based additive manufacturing system, the nozzle comprising or describing a filament passageway or flow path and comprising one or more heat transfer elements projecting into the filament passageway or flow path.

The provision of heat transfer elements projecting into the filament passageway or flow path improves drastically the heat transfer into build material advancing therethrough.

The filament passageway or flow path may be surrounded at least in part by the or a body of the nozzle. The filament passageway or flow path may be described at least in part by the body. The insert may comprise a tip insert. The nozzle may comprise one or more inserts, e.g. additional inserts. The or each insert or additional insert may be received, for example releasably received, within the body. Alternatively, the or each insert or additional insert may be secured or fixed or immovably received within the body. The filament passageway or flow path may be described at least in part by the insert(s). The filament passageway or flow path may comprise an inlet, e.g. for receiving a solid filament of build material. The filament passageway or flow path may comprise an outlet, e.g. through which molten build material exits the nozzle and/or is deposited on a build bed in use.

A more specific aspect of the invention provides a nozzle for an extrusion-based additive manufacturing system, the nozzle comprising a body, one or more inserts secured within the body and a filament passageway or flow path described by the body and insert(s), the filament passageway or flow path comprising an inlet for receiving a solid filament of build material and an outlet through which molten build material exits the nozzle and/or is deposited on a build bed in use, wherein the nozzle comprises one or more heat transfer elements projecting into the filament passageway or flow path upstream of the outlet.

The flow path may comprise a filament passageway or vice versa. The filament passageway may be at or adjacent or extending from a first end, e.g. an upstream end, of the body. The filament passageway may include the inlet. The body may comprise a bore, at least part of which may describe the inlet and/or filament passageway and/or at least part of the filament passageway or flow path. The inlet and/or filament passageway may be shaped and/or configured to receive a solid or semi-solid filament. The filament passageway may be upstream of the heat transfer element(s). The body may have a connecting feature, which may be at or adjacent the first end, e.g. for connecting the nozzle to a heater of a liquefier assembly.

The or each insert may be in thermal contact with the body. The or each insert may be press-fit into the body, e.g. into the bore of the body. The or each insert may be in interference fit with the body. Alternatively, the or each insert may be retained within the body by some other means, for example a mechanical means or it may be bonded, such as brazed or welded.

The filament passageway or flow path may narrow toward the outlet. The filament passageway or flow path may comprise an outlet portion, which may include the narrowing and/or may include the outlet. The narrowing may comprise a transition and/or a tapering. The narrowing may be formed or described by a tapering or conical or frusto-conical surface. The outlet portion may, but need not, include a straight or cylindrical portion upstream of the narrowing. The outlet portion may, but need not, include a straight or cylindrical portion downstream of the narrowing.

The one or more inserts may comprise a tip insert. The tip insert may be downstream of the heat transfer elements. The tip insert may be within or received within a second end, e.g. a downstream end, or end portion of the body or the bore thereof. The tip insert may be received within a receptacle at or adjacent the second or downstream end of the body. The receptacle may form part of and/or be described by the bore of the body. The heat transfer element(s) may be upstream of the receptacle and/or of the tip insert. The tip insert may describe at least part of the filament passageway or flow path, e.g. an outlet of the filament passageway or flow path. The tip insert may describe the outlet and/or the outlet portion of the filament passageway or flow path.

The use of a tip insert provides unfettered access to both ends of the body, enabling more complex geometries within the bore thereof.

The receptacle may have a mouth, for example at the second end of the body. The receptacle may have a substantially constant cross-section, e.g. from the mouth to the filament passageway. The receptacle may have a substantially constant cross-section extending from a mouth at the second, downstream end of the body. The receptacle may have a base. The body may comprise a step, e.g. an internal step. The step may join the receptacle and the filament passageway or adjacent portion of the bore of the body. The step may comprise a radial step. The step may describe a plane, which may be substantially perpendicular to the filament passageway and/or the receptacle or its axis or their axes. The plane may be substantially perpendicular to the filament passageway or flow path and/or the bore of the body and/or the receptacle or its axis or their axes.

The insert or tip insert and the second end of the body describe, e.g. together describe, a substantially contiguous surface. In some examples, the substantially contiguous surface is substantially perpendicular to the filament passageway and/or the receptacle or its axis or their axes. In some examples, the substantially contiguous surface is substantially perpendicular to the filament passageway or flow path and/or the receptacle or its axis or their axes. The insert or tip insert may comprise a tapered or conical outer surface, for example between the substantially contiguous surface and the outlet. Thus, the insert or tip insert may describe a protruding portion of the nozzle. The insert or tip insert may describe the outer surface of the nozzle that is configured to contact, in use, deposited material.

Thus, the geometry of the insert may be such that the body is substantially protected from exposure to deposited material, thereby reducing wear to the body. This enables the body to be formed of a material selected for its thermal performance, without the need for any substantial wear resistant properties.

In other examples, the substantially contiguous surface may be tapered.

The insert or tip insert may comprise a tapered or conical tip, which may comprise or describe the tapered or conical outer surface. The outlet portion and/or the transition may be within the tapered or conical tip. The angle of the transition may be similar to that of the outer surface of the tapered or conical tip, e.g. such that a substantially constant thickness is described therebetween. The angle of the narrowing or taper of the outlet portion may be similar to that of the outer surface of the tapered or conical tip, e.g. such that a substantially constant thickness is described therebetween.

This, substantially constant thickness has been found to balance strength with thermal mass, given the lower thermal conductivity of the insert.

The nozzle or body may comprise a head, which may describe the second end of the body. The head may be shaped and/or configured to engage and/or be driven, in use, by a tool, for example to connect the connecting feature of the nozzle to a heater of a liquefier assembly. The connecting feature of the body may comprise one or more threads, e.g. external threads. The threads of the body may be configured to engage, in use, with one or more threads, e.g. internal threads, of a heater of a liquefier assembly. The head may comprise one or more, such as a pair of, flats, e.g. for engaging a tool. The head may comprise a polygonal cross-section, such as a hexagonal cross-section. The body may comprise a necked portion, for example between the connecting feature and the head.

The liquefier nozzle may comprise a coating. The coating may comprise one or more layers. The coating may be on at least part of the nozzle, for example at least the second end of the insert or tip insert. The coating may cover at least part of the second end of the body. The coating may cover at least part of, e.g. most or all of, the substantially contiguous surface. Preferably, the coating covers the external surfaces of the nozzle, with the exception of a sealing face at the first end of the body. This has been found to impart wear and corrosion resistance to the entire body, without compromising the seal between the nozzle and the mating face against which it is to be sealed.

The coating may be harder, e.g. may have a higher hardness, than at least one or each of the first and second material. The coating may have a modified chemical composition to reduce adhesion of molten plastic thereto. The coating may comprise a hard material. The coating may comprise a vapour deposition coating, for example a physical or chemical vapour deposition coating. The coating may comprise a diamond-like carbon coating. Alternatively, the coating may comprise a high velocity oxygen fuel coating.

The heat transfer element(s) may be configured to transfer, in use, heat from the body into a central portion of a build material advancing through the filament passageway or flow path. The one or more inserts may comprise a heat transfer insert, which may include the heat transfer element(s). The body or bore thereof may comprise a shoulder, which may be between the first end and the tip insert or receptacle. The heat transfer insert may be captivated between the shoulder and the tip insert. The tip insert may retain the heat transfer insert within the body or the bore thereof. In some embodiments, the tip insert is press-fit into an interference engagement within the body and retains the heat transfer insert within the body or the bore thereof. The heat transfer insert may, but need not, be press-fit into the body or the bore thereof. In some embodiments, the interference between the heat transfer insert and the body is less than the interference between the tip insert and the body.

The heat transfer insert may comprise a tubular wall, e.g. having an outer surface and/or an inner surface. The outer surface may be in thermal contact with the body. The inner surface may describe at least part of the filament passageway or flow path. The inner surface may be aligned and/or substantially contiguous with an adjacent portion of the part of the filament passageway or flow path described by the body. The tubular wall may have an internal diameter that is similar to, matches or is substantially the same as an adjacent portion of the part of the filament passageway or flow path described by the body.

The heat transfer insert may be segmented. The heat transfer insert may be one of a plurality of heat transfer inserts. Each of the plurality of heat transfer inserts may comprise at least one heat transfer element.

The or each heat transfer element may project from the inner surface, e.g. into the filament passageway or flow path. The or each heat transfer element may extend along a portion or part of the tubular wall, for example only a portion or part thereof. The portion or part may comprise a downstream portion or part of the tubular wall. An upstream portion or part and/or a central portion or part of or along the tubular wall may be free of the heat transfer element(s).

The or each heat transfer element may be formed integrally with the tubular wall, e.g. as a single monolithically continuous structure. The heat transfer insert may comprise or be formed as a single, monolithically continuous structure. Alternatively, the heat transfer element(s) may be discontinuous from the tubular wall. The heat transfer element(s) may be bonded or mechanically secured to the tubular wall.

The or each heat transfer element may be formed separately from the tubular wall. The or each heat transfer element may be mounted and/or secured or bonded to the tubular wall.

The tubular wall may comprise one or more slots on or in its inner surface, which may receive an outer portion or a respective outer portion of the or a respective heat transfer element. The slots may, but need not, extend through the thickness of the tubular wall. The width of the or each slot may be slightly less than a thickness of the or the respective outer portion of the or the respective heat transfer element. The or each heat transfer element may be secured mechanically, e.g. press-fit, or bonded, e.g. welded or brazed, to the tubular wall.

The or each heat transfer element may be formed integrally with the nozzle or body, e.g. as a single monolithically continuous structure. Alternatively, the heat transfer element(s) may be discontinuous from the nozzle or body. The heat transfer element(s) may be bonded or mechanically secured to the nozzle or body.

The or each heat transfer element may be formed separately from the body. The or each heat transfer element may be mounted and/or secured or bonded to the body. The body may comprise one or more slots on or in an inner surface thereof, e.g. which describes the passageway. The slot(s) may receive an outer portion or a respective outer portion of the or a respective heat transfer element. The width of the or each slot may be slightly less than a thickness of the or the respective outer portion of the or the respective heat transfer element. The or each heat transfer element may be secured mechanically, e.g. press-fit, or bonded, e.g. welded or brazed, to the body.

The or each heat transfer element is configured to transfer heat passively into the filament passageway or flow path. The or each heat transfer element may be in electrical and/or thermal contact with the body. The or each heat transfer element may be solid.

In some examples, the heat transfer element(s) of the heat transfer insert are in direct contact with the nozzle or body, e.g. without a tubular wall. In such examples, the passageway of the body may describe at least most or substantially all or all of the filament passageway or flow path of the nozzle.

The filament passageway or flow path may have a centre and/or a central region and/or a central axis or centreline.

The or each heat transfer element may span across the filament passageway or flow path. The or each heat transfer element may divide the filament passageway or flow path. The or each heat transfer element may intersect the centre, central region, central axis or centreline of the filament passageway or flow path. Alternatively, the centre, central region, central axis or centreline of the filament passageway or flow path may be free of heat transfer elements. Additionally or alternatively, the centre, central region, central axis or centreline may be circumscribed by at least a portion, e.g. a tubular portion, of the heat transfer element(s).

The heat transfer element(s) may describe a tortuous portion of the filament passageway or flow path. The heat transfer element(s) may describe a meandering portion of the filament passageway or flow path. The heat transfer element(s) may describe a zigzag or stepped portion of the filament passageway or flow path. The heat transfer element(s) may describe a helical portion of the filament passageway or flow path.

The or each heat transfer element may comprise one or more fins. The or each fin may be substantially planar or curved. Additionally or alternatively, the or each fin may taper, e.g. toward an apex and/or toward the centre, central region, central axis or centreline of the filament passageway or flow path. Additionally or alternatively, the heat transfer elements may comprise a plurality of fins, which may be spaced evenly about the periphery of and/or along the filament passageway or flow path.

In some examples, the heat transfer elements comprise a pair of fins. The pair of fins may extend across the filament passageway or flow path. The pair of fins may be parallel to and/or offset from one another. Each of the pair of fins may be on a respective side of the centre, central region, central axis or centreline of the filament passageway or flow path.

In examples, the heat transfer elements comprise two or more, e.g. a plurality of, fins that may be spaced circumferentially and/or about the periphery of the filament passageway or flow path. The heat transfer elements comprise two or more, e.g. a plurality of, fins that may be spaced circumferentially and/or about the inner periphery of the body, e.g. the passageway described by the body.

The fins may be joined to and/or support the tubular portion circumscribing the centre, central region, central axis or centreline of the filament passageway or flow path. The tubular portion circumscribing the centre, central region, central axis or centreline of the filament passageway or flow path may be joined to the body or the tubular wall of the heat transfer insert by the fins. The tubular portion circumscribing the centre, central region, central axis or centreline of the filament passageway or flow path may be supported within the filament passageway or flow path by the fins.

The or each heat transfer element may comprise an upstream portion or end. An outer portion of the upstream portion or end may be further upstream than a central portion thereof. The upstream portion or end may taper or be angled or curved toward the centre, central region, central axis or centreline of the filament passageway or flow path, e.g. to provide a lead-in. The or each heat transfer element may comprise a tapered end or lead-in, which may taper toward the centre, central region, central axis or centreline of the filament passageway or flow path. The tapered end or lead-in may be substantially conical or substantially V-shaped, e.g. when it spans across the filament passageway or flow path.

The tapered end or lead-in may be curved, for example it may form a U-shape or a curved V-shape or have a U-shaped or a curved V-shaped cross section. The tapered end or lead-in may be in the form of a curved funnel.

The heat transfer element may comprise an elongate element or member, such as a rod, core or spear. The elongate element or member may project into the filament passageway or flow path. The elongate element or member may be coaxial with the filament passageway or flow path. The elongate element or member may describe, e.g. with the filament passageway, an annular portion of the filament passageway or flow path. The elongate element or member may describe an inner part of an annular portion of the filament passageway or flow path. The element or member may be supported by one or more ribs, spokes or bars.

The heat transfer insert may comprise a ring, e.g. to which the elongate element or member is connected, e.g. by the rib(s), spoke(s) or bar(s). Alternatively, the heat transfer insert may comprise the elongate element or member and the rib(s), spoke(s) or bar(s), e.g. wherein the rib(s), spoke(s) or bar(s) are configured to engage the filament passageway or body.

In an alternative embodiment, the insert or wear resistant insert or tip insert may comprise the heat transfer element(s). The heat transfer element(s) may project from the insert or wear resistant insert or tip insert into the filament passageway or flow path. The heat transfer element(s) may project from an upstream side of the insert or wear resistant insert or tip insert. The heat transfer element(s) may be parallel and/or coaxial with the filament passageway or flow path. The heat transfer element(s) may extend along the filament passageway or flow path.

The insert or wear resistant insert or tip insert may comprise any of the aforementioned configurations of heat transfer elements. The insert or wear resistant insert or tip insert may comprise the elongate element or member, which may project into the filament passageway or flow path. The elongate element or member may be supported by one or more ribs, spokes or bars, which may join the elongate element or member to the insert or wear resistant insert or tip insert.

The insert or wear resistant insert or tip insert may comprise one or more holes, slots or channels, e.g. a plurality of holes, slots or channels. The holes or channels may be around or spaced, located or distributed around the elongate core. The holes or channels may together provide the tapered transition joining the filament passageway or flow path to the outlet. The holes or channels may join or connect the annular portion of the filament passageway or flow path to the outlet.

The heat transfer insert may be formed of the first material, the second material, or a third material. The first material may be more thermally conductive than the third material. The third material may also be wear resistant, for example more wear resistant than the first material. The coefficient of thermal expansion of the first material may be more, for example at least 20% more or at least 30% more, than that of the third material. The coefficient of thermal expansion of the first material may be between 20%-50% more, such as 30%-40% more, than that of the third material.

In an alternative class of embodiments, the tip insert may be omitted. For example, the outlet and/or outlet portion of the filament passageway or flow path may be described by the body or the bore thereof. The body or the bore thereof may include a shoulder, which may be upstream of the outlet and/or adjacent or abut the outlet portion. The heat transfer insert may abut the shoulder. The shoulder may be formed by the narrowing of the outlet portion. The shoulder may be formed by a step in the bore of the body.

Another aspect of the invention provides a method of manufacturing a liquefier nozzle for an additive manufacturing system, e.g. a liquefier nozzle as described above. The method may comprise inserting at least one insert into a nozzle body. The method may comprise making, e.g. using a subtractive manufacturing process such as machining, the nozzle body. The method may comprise making, e.g. using a subtractive manufacturing process such as machining, the or each insert. The nozzle, body and/or insert(s) may comprise any one or more features described above.

The method may comprise inserting a heat transfer insert into a downstream end of the nozzle body, e.g. until it abuts a shoulder therein. The method may comprise press-fitting a tip insert into the downstream end of the nozzle body, e.g. to captivate the heat transfer insert between the tip insert and the shoulder.

Another aspect of the invention provides a method of manufacturing a liquefier nozzle for an additive manufacturing system, the method comprising: providing a body formed of a first, thermally conductive material and having: a connecting feature at or adjacent a first, upstream end of the body for connecting the nozzle to a heater of a liquefier assembly; a receptacle extending from a second, downstream end of the body; and a filament passageway extending from the first end of the body to the receptacle and having a smaller diameter than the receptacle; providing an insert formed of a second, wear resistant material and having: a filament passageway extending from an upstream end of the insert; an outlet at a downstream end of the insert, which has a smaller diameter than the filament passageway of the insert; and a tapered transition joining the filament passageway to the outlet; and press-fitting the insert into an interference engagement within the receptacle of the body from the second end of the body, such that the filament passageways of each of the body and the insert are aligned with one another.

The method may comprise applying a coating to at least part of the nozzle, for example at least the first and of the insert. The coating may be applied to at least part of the second end of the body. The coating may be applied to the head, e.g. most of or the entire head. Preferably, the method comprises applying a coating to the external surfaces, for example all external surfaces, of the nozzle, e.g. with the exception of a sealing face at the first end of the body.

The method may comprise applying the coating using a vapour deposition process, for example a physical or chemical vapour deposition process. The vapour deposition process may, but need not, involve the use of a plasma. Preferably, the method comprises applying the coating using a physical vapour deposition process and/or the coating may comprise a diamond-like carbon coating. Alternatively, the method may comprise applying the coating using a high velocity oxygen fuel coating process.

Another aspect of the invention provides a method of recycling a nozzle, e.g. a nozzle as described above. The method may comprise heating the body, for example to a temperature above 300° C., preferably above 500° C. and more preferably above 700° C. The method may comprise removing the insert from the body, e.g. from the receptacle of the body, whilst it is in the heated state, e.g. at said temperature.

The coefficient of thermal expansion of the first material may be at least 20% more than that of the second material, e.g. for facilitating insertion of the insert into the body.

Another aspect of the invention provides a method of heating a build material, e.g. as it advances through a nozzle of an extrusion-based additive manufacturing system. The method may comprise advancing a build material along a filament passageway or flow path of a nozzle as heat is applied to a body of the nozzle surrounding the filament passageway or flow path. The method may comprise transferring the applied heat into the filament passageway or flow path by one or more heat transfer elements, e.g. thereby to heat a central portion of the build material as it passes around and/or over the one or more heat transfer elements in the filament passageway or flow path.

The method may comprise advancing the build material along the filament passageway or flow path such that it contacts a tapered end or lead-in of the heat transfer element(s). The method may comprise continuing to advance the build material along the filament passageway or flow path such that the tapered end or lead-in penetrates into the build material, e.g. whilst it is semi-molten and/or whilst an outer portion of the build material is molten and an inner portion thereof is solid.

The method may comprise twisting the build material as it advances over a helical heat transfer element of the nozzle. The method may comprise twisting the build material about a core described by a central region of the filament passageway or flow path that is free of heat transfer element(s).

The method may comprise the use of a nozzle assembly described above.

Another aspect of the invention provides a liquefier assembly comprising a nozzle as described above and/or configured to carry out the method described above.

Another aspect of the invention provides an additive manufacturing system. The additive manufacturing system may comprise a nozzle as described above or a liquefier assembly as described above. The additive manufacturing system may be configured to carry out the method described above.

For the avoidance of doubt, any of the features described herein apply equally to any aspect of the invention. For example, the kit may comprise any one or more features of the nozzle or liquefier assembly relevant thereto and/or the method may comprise any one or more features or steps relevant to one or more features of the nozzle, liquefier assembly or the kit or the additive manufacturing system.

Another aspect of the invention provides a computer program element comprising and/or describing and/or defining a three-dimensional design, e.g. of the nozzle, body or insert described above or an embodiment thereof. The three-dimensional design may be for use with a simulation means or an additive or subtractive manufacturing means, system or device.

The computer program element may be for causing, or operable or configured to cause, an additive or subtractive manufacturing means, system or device to manufacture the nozzle, body or insert described above or an embodiment thereof. The computer program element may comprise computer readable program code means for causing an additive or subtractive manufacturing means, system or device to execute a procedure to manufacture the nozzle, body or insert described above or an embodiment thereof.

A further aspect of the invention provides a computer program element comprising computer readable program code means for causing a processor to execute a procedure to implement one or more steps of the aforementioned method.

A yet further aspect of the invention provides the computer program element embodied on a computer readable medium.

A yet further aspect of the invention provides a computer readable medium having a program stored thereon, where the program is arranged to make a computer execute a procedure to implement one or more steps of the aforementioned method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Embodiments of the invention will now be described by way of example only with reference to the accompanying drawings in which.

Figure 1:
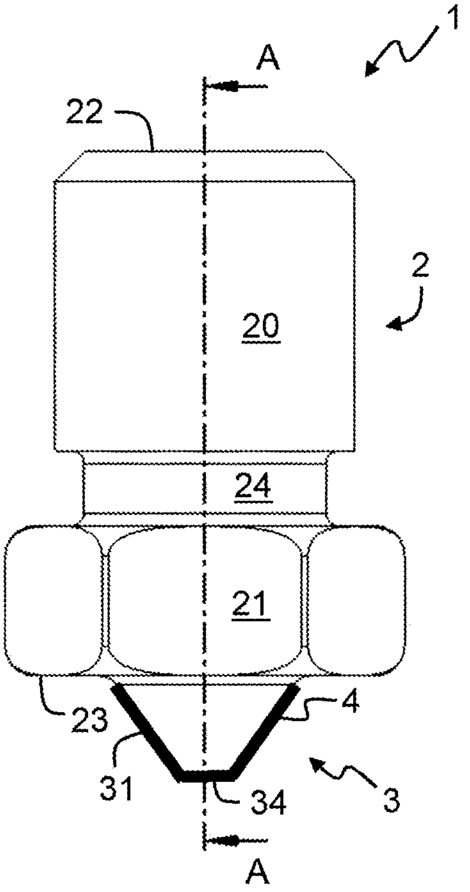
FIG. 1 is a side view of a nozzle according to a first example.
Figure 2:
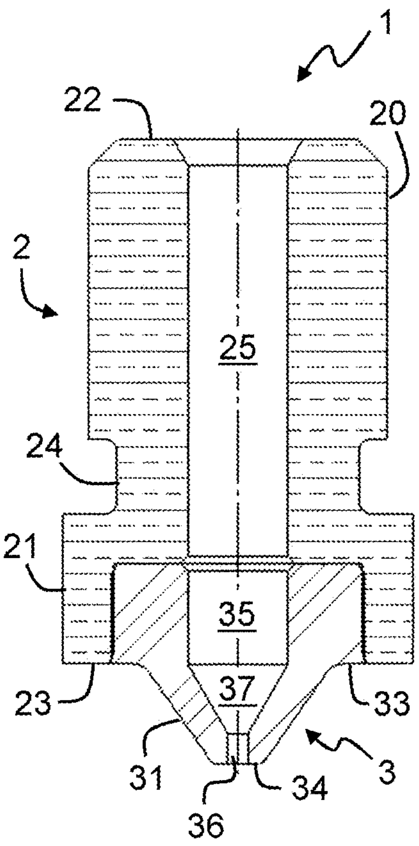
FIG. 2 is a section view through line A-A in FIG. 1.

Referring now to FIGS. 1 and 2, there is shown a liquefier nozzle 1 for an additive manufacturing system. The nozzle 1 includes a body 2 formed of a first material and an insert 3 formed of a second material and received within the body 2.

Figure 3:
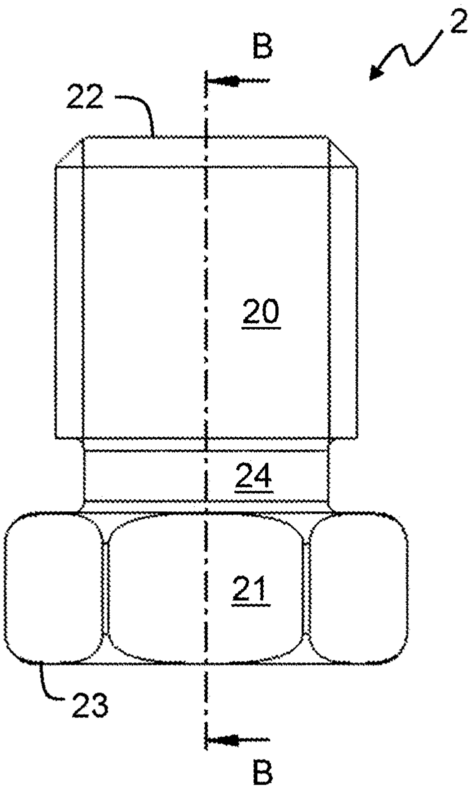
FIG. 3 is a side view of the body of the nozzle of FIG. 1.
Figure 4:
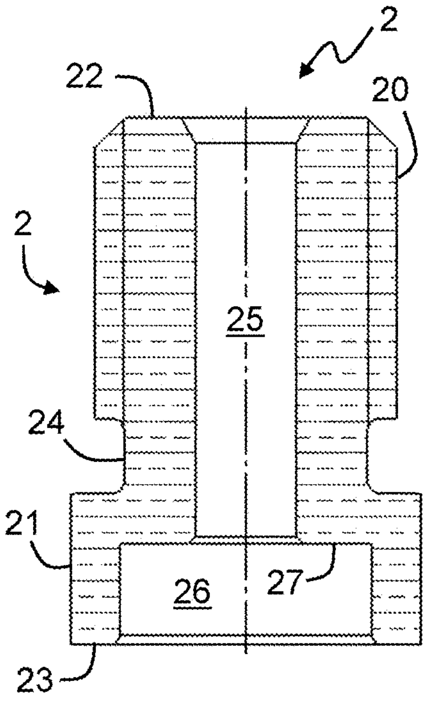
FIG. 4 is a section view through line B-B in FIG. 3.

The body 2, shown more clearly in FIGS. 3 and 4, includes a cylindrical, threaded engaging portion 20 and a head portion 21. The threaded engaging portion 20 describes a first, upstream end 22 and the head portion 21 describes a second, downstream end 23. The head portion 21 has a hexagonal cross-section in this example and is joined to the threaded engaging portion 20 by a necked region 24.

The body 2 also includes a filament passageway 25, which extends from the first end 21 toward the second end 23, and a receptacle 26 extending from the second end 23 toward the first end 21. The filament passageway 25 has a first diameter, which is slightly larger than a filament to be received therein. The receptacle 26 has a second diameter, larger than the first diameter and is sized to receive the insert 3 in an interference fit. The filament passageway 25 is joined to the receptacle 26 by a radial step 27.

Figure 5:
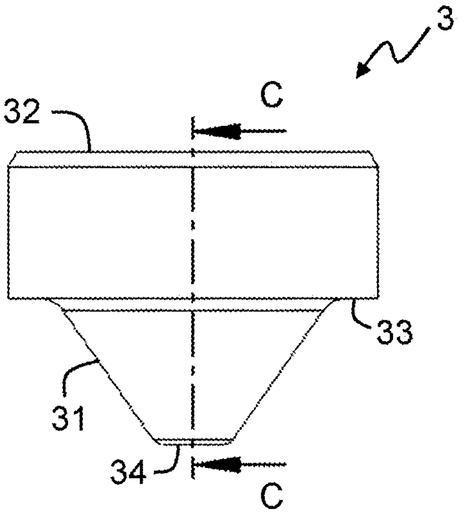
FIG. 5 is a side view of the insert of the nozzle of FIG. 1.
Figure 6:
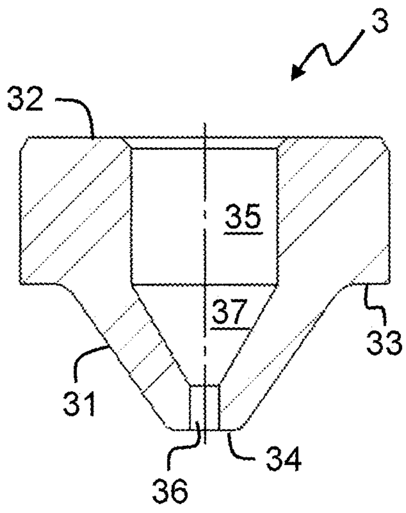
FIG. 6 is a section view through line C-C in FIG. 5.

The insert 3, shown more clearly in FIGS. 5 and 6, includes a cylindrical base 30 and a conical tip 31. The base 30 describes a first, upstream end 32 and includes a downstream face 33 from which the conical tip 31 projects. The conical tip 31 has describes a second, downstream end 34 corresponding to a truncated apex of the conical tip 31.

The insert 3 also includes a filament passageway 35, which extends from the first end 32 toward the second end 34 and an outlet 36, which extends from the second end 34 toward the first end 32. The filament passageway 35 of the insert 3 has a diameter similar to that of the filament passageway 25 of the body 2. The outlet 36 has a smaller diameter than that of the filament passageway 35 and is joined to the filament passageway 35 by a tapered transition 37.

In this example, the filament passageway 35 is within the base 30 and extends substantially the entire length thereof, while the transition 37 and outlet 36 are both within the conical tip 31. The angle of the transition 37 is similar to that of the outer surface of the conical tip 31, such that a substantially constant thickness is described therebetween.

In the assembled condition, shown in FIGS. 1 and 2, the downstream face 33 of the base 30 of the insert 3 is substantially contiguous with the surrounding surface of the head portion 21, describing the second end 23. Thus, the protruding conical tip 31 is described entirely by the insert, which is particularly advantageous for the reasons given below.

The first material is thermally conductive to conduct heat from the heater (not shown) to a filament (not shown) received within the nozzle. In this example, the first material is copper alloy. The applicants have determined that an appropriate material has a composition including mainly copper, with the inclusion of 0.5%-1.5% chromium and 0.05%-0.25% zirconium. However, the skilled person will appreciate that other material may be suitable, such as copper alloys, but these should be selected to provide a balance between thermal performance and cost.

The second material is wear resistant to resist wear caused by high temperatures and pressures, particularly when processing aggressive materials, such as composites. The second material is a steel composition which is wear resistant, but which is also relatively machinable. The applicants have determined that an appropriate material has a composition including 1.00%-1.60% chromium, 0.90%-1.20% carbon, 0.30%-0.75% manganese, 0.10%-0.35% silicon, up to 0.40% nickel, up to 0.15% molybdenum, up to 0.05% of sulphur, up to 0.05% phosphorus, up to 0.05% vanadium and is substantially free of Tungsten, with the exception of impurities.

The applicants have also determined that the use of a first material having a coefficient of thermal expansion that is at least 30% more than that of the second material can be advantageous for recycling the insert. This difference enables the insert 3 to be more easily removed from the interference engagement within the body 2. More specifically, the body 2 can be heated to an appropriate temperature, for example 800° C., which increases the diameter of the receptacle 26. By then, the force required to push the insert 3 out of the receptacle is greatly reduced, which enables the insert 3 to be separated more readily from the body, which facilitates recycling.

The regions of the internal passageway that are exposed to the greatest pressures, and therefore the greatest abrasion, and therefore requiring greater wear resistance, are those which describe the tapered transition 37 and the outlet 36. As such, these regions are described by the insert, and therefore are formed of the second, wear resistant material.

The outer surfaces that are exposed to the greatest abrasion include the outer surface and truncated apex 34 of the conical tip 31. These outer surfaces are dragged across molten material, which can both cause wear and result in the accumulation of debris. As such, it is beneficial if these surfaces have characteristics that reduce adhesion of molten plastic thereto. As mentioned above, these surfaces are provided entirely by the insert, and therefore are formed of the second, wear resistant material.

An optional feature of the invention provides a hardened coating 4 on at least these outer surfaces, as illustrated schematically in FIG. 1. As a further optional feature, the coating 4 may be applied to at least part of the head portion 21, for example to reduce the possibility of delamination. In fact, the applicants have found that applying the coating 4 across the entire nozzle 1, with the exception of the upstream end 22, improves the performance of the nozzle, without having a detrimental effect on its thermal conductivity. The reason for omitting the coating 4 on the upstream end 22 is that the copper alloy material is able to deform more readily into engagement with the mating face against which it is to be sealed.

The hardened coating preferably also has a modified chemical composition that reduces adhesion of molten plastic to the coated surfaces. The applicants have determined that diamond-like carbon coatings are particularly well suited, especially those having such a modified chemical composition.

Figure 7:
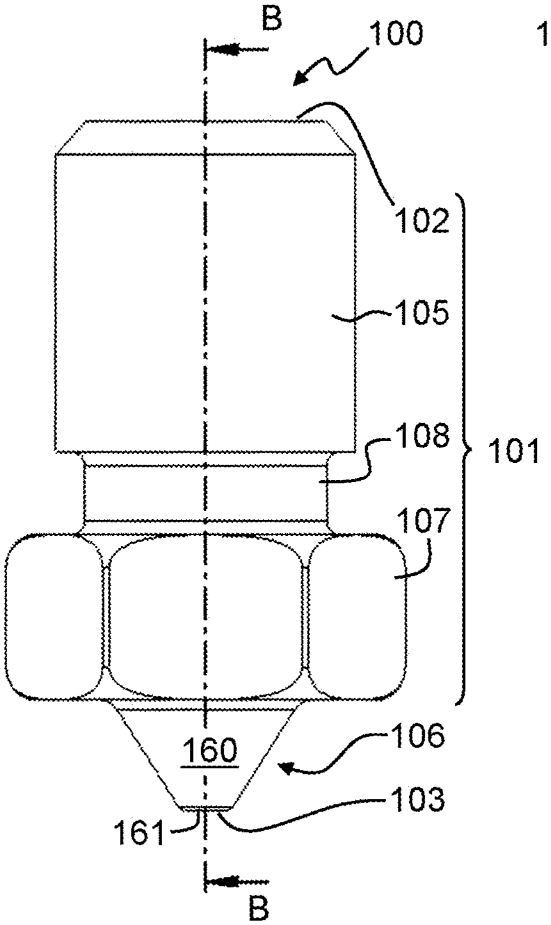
FIG. 7 is a side view of a nozzle according to a second example.

FIG. 7 illustrates a nozzle 100 according to another example. The nozzle 100 includes a body 101. The nozzle 100 has a first, upstream end 102, a second, downstream end 103, a threaded portion 105 toward the upstream end 102, a tip 106 at the downstream end 103 and a hexagonal flange 107 between the tip 106 and the threaded portion 105. The threaded portion 105 is joined to the hexagonal flange 107 by a necked portion 108. The tip 106 includes a frustoconical outer surface 160 terminating at a flat apex 161.

Figure 8:
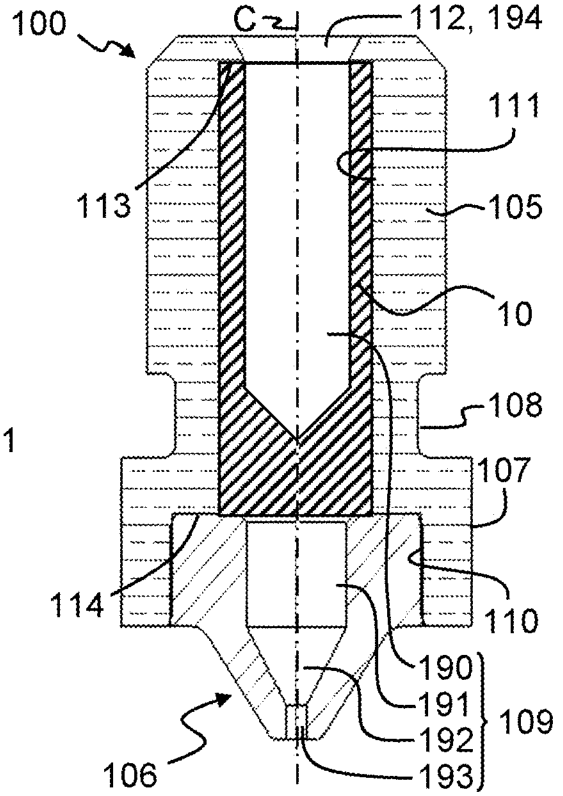
FIG. 8 is a cross-sectional view of the nozzle of FIG. 7 through line B-B with a heat transfer insert according to a first example received in the nozzle body and retained by a tip insert.

As illustrated more clearly in FIG. 8, the tip 106 is in the form of a tip insert 106 in this example. The nozzle 100 describes a filament passageway or flow path 109 extending from the upstream end 102 to the downstream end 103. The body 101 describes a bore that includes a tip insert receiving portion 110, a heat transfer receiving portion 111 and an inlet portion 112. The diameter of the tip insert receiving portion 110 is larger than that of the heat transfer receiving portion 111, which itself is larger than the inlet portion 112. As a result, a first shoulder 113 is formed between the heat transfer receiving portion 111 and the inlet portion 112, and a second shoulder 114 is formed between the tip insert receiving portion 110 and the heat transfer receiving portion 111.

The tip insert receiving portion 110 is configured to receive the tip insert 106, while the heat transfer insert receiving portion 111 is configured to receive a heat transfer insert 10, an example of which is shown for clarity. However, the heat transfer insert receiving portion 111 of the body 101 is configured to receive any one of several other heat transfer inserts 20, 30, 40, 50, 60, examples of which are described below.

The heat transfer insert 10, 20, 30, 40, 50, 60 is press-fit into the heat transfer insert receiving portion 111 until it abuts the first shoulder 113. The tip insert 106 is then press-fit into the tip insert receiving portion 110 until it abuts the second shoulder 114, thereby to captivate the heat transfer insert 10, 20, 30, 40, 50, 60 between it and the first shoulder 113. As a result, the heat transfer insert 10, 20, 30, 40, 50, 60 is both captivated within and held in an interference fit within the heat transfer insert receiving portion 111, such that it shares a common centreline C with the nozzle 100.

Figure 9:
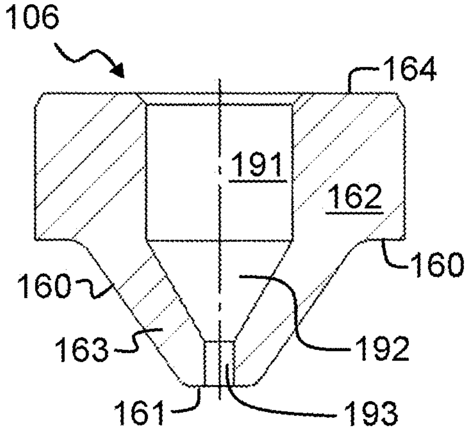
FIG. 9 is a cross-sectional view of the tip insert of the nozzle of FIGS. 7 and 8.

The tip insert 106, shown more clearly in FIG. 9, includes a cylindrical base 162 and a conical tip 163. The base 162 describes a first, upstream end 164 and includes a downstream face 165 from which the conical tip 163 projects. The conical tip 163 describes the frustoconical outer surface 160 and its second, downstream end corresponds to the truncated, flat apex 161 of the conical tip 163. The tip insert 106 also describes a straight flow portion 191, a tapered flow portion 192 and an outlet flow portion 193.

The straight flow portion 191 extends from the first end 164 of the tip insert 106 toward the flat apex 161. The outlet flow portion 193 extends from the flat apex 161 toward the first end 164 and has a smaller diameter than that of the straight flow portion 191. The tapered flow portion 192 joins the straight flow portion 191 to the outlet flow portion 193, thereby providing a transition between their respective diameters.

In this example, the straight flow portion 191 is within the base 162 and extends substantially the entire length thereof, while the tapered and outlet flow portions 192, 193 are both within the conical tip 163. The angle of the tapered flow portion 192 is similar to that of the frustoconical outer surface 160, such that a substantially constant thickness is described therebetween.

The inlet portion 112 describes a tapered lead-in 194 of the flow path 109 for a filament of build material (not shown). Each of the heat transfer inserts 10, 20, 30, 40, 50, 60 is configured to describe an upstream, heat transfer insert portion 190 of the flow path 109, while the straight, tapered and outlet flow portions 191, 192, 193 together describe a downstream part of the flow path 109. The flow path 109 is centred on and extends along a centreline C of the nozzle 100 and narrows from the inlet portion 112, through the heat transfer insert portion 190, straight, tapered and outlet flow portions 191, 192, 193.

Figure 10:
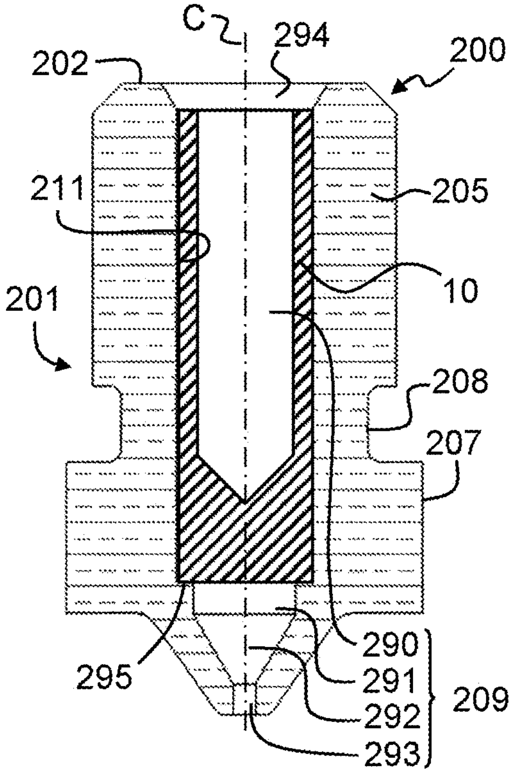
FIG. 10 is a cross-sectional view similar to FIG. 8 showing the heat transfer insert received within an alternative nozzle body, which does not include a tip insert.

Turning now to FIG. 10, there is shown an alternative nozzle 200 which is similar to the nozzle 100 of FIGS. 7 and 8, wherein like references depict like features incremented by 100. The nozzle 200 according to this example differs from that of the previous example in that the tip 206 is integral with the body 201, rather than being provided as a separate insert 106. The shoulders 113, 114 are also omitted as a result. Instead, a shoulder 295 is provided between the heat transfer receiving portion 211 and the straight flow portion 291.

The skilled person will appreciate that the heat transfer insert 10, 20, 30, 40, 50, 60 in the case of this example would be press-fit into the heat transfer insert receiving portion 211 from the upstream end 202 until it abuts the shoulder 295. Thus, in this case the heat transfer insert 10, 20, 30, 40, 50, 60 is merely retained within the body 201 by an interference fit. It is not captivated, as in the nozzle 100 described above.

The skilled person will appreciate that other arrangements are envisaged for retaining the heat transfer insert 10, 20, 30, 40, 50, 60 in position, such as mechanical means and/or bonding, brazing, welding and the like.

Figure 11:
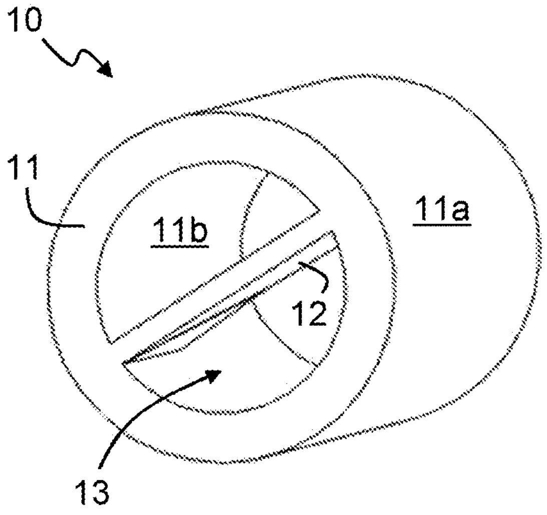
FIG. 11 is an end perspective view of the heat transfer insert shown in FIGS. 6 and 10.
Figure 12:
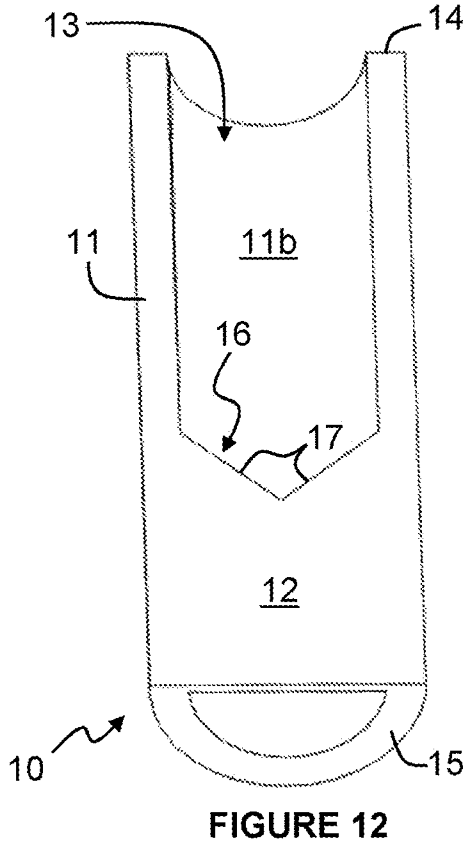
FIG. 12 is a cross-sectional perspective view of the insert of FIG. 11.

Turning now to FIGS. 11 and 12, the heat transfer insert 10 shown in FIGS. 8 and 10 is illustrated in greater detail. The heat transfer insert 10 in this example includes a tubular wall 11 and a single heat transfer fin 12. The tubular wall 11 has an outer surface 11*a* in interference fit contact with the body 101 of the nozzle 100. The tubular wall 11 also has an inner surface 11*b* describing an insert flow path 13, which extends from an upstream end 14 of the heat transfer insert 10 to a downstream end 15 thereof. The skilled person will appreciate that the insert flow path 13 of the heat transfer insert 10 according to this example corresponds to the heat transfer insert portion 190 of the flow path 109 of the nozzle.

The heat transfer fin 12 is planar with a substantially constant thickness and spans across the insert flow path 13 and intersects the centreline C in this example. The heat transfer fin 12 is located in a downstream portion of the heat transfer insert 10, and extends along approximately ⅓ of the length of the insert flow path 13 in this example. The heat transfer fin 12 also includes a lead-in 16, which tapers from the tubular wall 11 toward the centreline C to form a V-shape in plan. The thickness of the heat transfer fin 12 also tapers to an apex to form a sharp edge 17 describing the lead-in 16.

The heat transfer fin 12 is formed of a thermally conductive material. The precise material used will vary depending upon the requisite properties. Wear resistant copper alloys may be suitable for many extrusion-based additive manufacturing materials. One non-limiting example of such a copper alloy is chromium zirconium copper. However, materials having greater wear resistance may be required for more abrasive materials. Suitable materials may include wear resistant and thermally conductive steel alloys. One non-limiting example of such a steel alloy is a chromium-molybdenum alloy steel.

In use, the nozzle 100 is threadedly engaged within a heater (not shown) and a filament of build material (not shown) is fed from a feed mechanism (not shown) into the insert flow path 13 via the lead-in 194 of the nozzle 100. As it advances, the build material contacts the inner surface 11*b* of the tubular wall 11 describing the insert flow path 13 and heat is transferred from the tubular wall 11 into the solid or semi-solid build material. This creates a temperature gradient through the build material, which decreases as it approaches its centre. As a result, a peripheral region of the build material melts first and the centre melts last. The thermal conductivity of build material is relatively low, which increases the residence time required for its central region to reach a high enough temperature to be extruded through the outlet flow portion 193 of the nozzle 100.

The heat transfer fin 12 improves the heat distribution through the build material by introducing heat into its central region. As the build material approaches the heat transfer fin 12, the molten or semi-molten peripheral portion of the build material comes into contact with outer portions of the sharp edges 17 of the lead-in 16 of the heat transfer fin 12 first, which provide a slicing edge 17 that cuts into and heats the central, colder region of the build material as it advances. Further advancement of the build material causes it to separate into two portions, one on either side of the heat transfer fin 12. As a result, the surface area across which heat is transferred from the heat transfer insert 10 into the build material is increased drastically.

As the now-molten build material exits the downstream end 15 of the heat transfer insert 10, it enters the straight flow portion 191 of the flow path 109 and comes into contact with the tapered flow portion 192 thereof. In this example, the inner diameter of the tubular wall 11 matches substantially the diameter of the straight flow portion 191 such that the inner surface 11*b* describing an insert flow path 13 is substantially contiguous with the surface describing the straight flow portion 191. As the build material is forced against the tapered flow portion 192, the flow area reduces and the flow velocity increases therealong until it reaches the outlet flow portion 193, where it is extruded out of the nozzle 100 and onto the build bed.

The heat transfer fin 12 provides several benefits. Firstly, the heat transfer fin 12 increases the rate of heat transfer from the body 101 of the nozzle 100 into the build material, due to the increased surface area across which heat is transferred. This reduces the residence time required and therefore can enable higher flow rates to be achieved. Secondly, the introduction of heat into the central region of build material improves the homogeneity of the melt exiting the nozzle 100, which can improve the properties of the article manufactured by the system. Other advantages will be appreciated by the skilled person.

Figure 13:
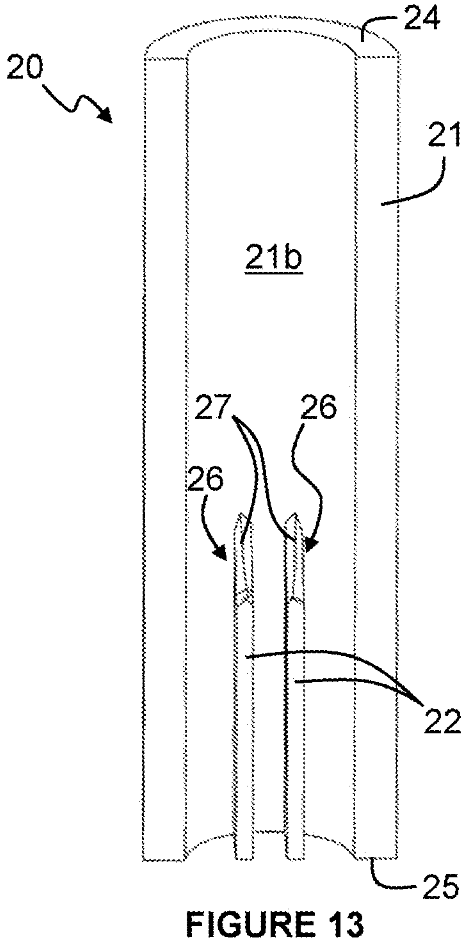
FIG. 13 is an end perspective view of an insert according to another example for receipt within the nozzle of FIG. 8 or the nozzle of FIG. 10.
Figure 14:
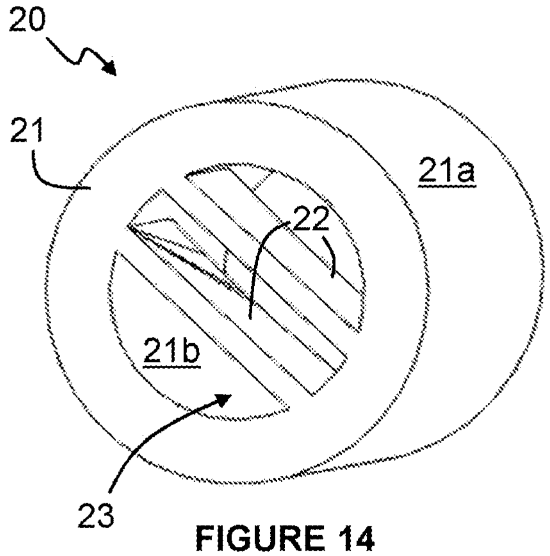
FIG. 14 is a cross-sectional perspective view of the insert of FIG. 7.

Turning now to FIGS. 13 and 14, there is shown a heat transfer insert 20 according to another example, which is also configured to be press-fit into the body 101 of the nozzle 100 in place of the heat transfer insert 10 described above. The heat transfer insert 20 according to this example is similar to the heat transfer insert 10 described above, wherein like references depict like features incremented by 10, which will not be described further.

The heat transfer insert 20 according to this example differs from the previous example in that it includes a pair of parallel heat transfer fins 22, each on a respective side of the centreline C. As with the first example, each heat transfer fin 22 includes a tapered lead-in 26 described by sharp edges 27. However, the provision of two heat transfer fins 22 doubles the surface area across which heat is transferred to the central region of the build material.

In use, a filament of build material (not shown) is fed from a feed mechanism (not shown) into the insert flow path 23 via the lead-in 194 of the nozzle 100 and progresses in a similar manner to that which is described above in relation to the heat transfer insert 10 according to the first example.

The skilled person will appreciate that the provision of two heat transfer fins 22 further improves the melt homogeneity and the rate at which heat is transferred into the build material. However, this may also increase the resistance to flow, thereby increasing the force required to feed the build material through the nozzle 100. The number of fins 12, 22 and their geometry may be selected to provide the desired balance between the aforementioned benefits of the invention and any drawbacks resulting from the presence of the fins 12, 22.

Figure 15:
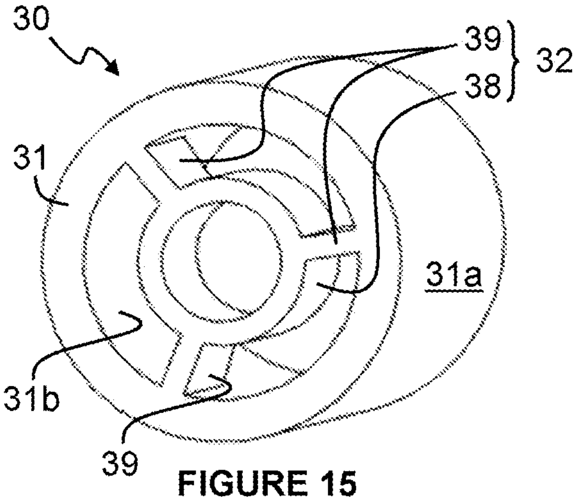
FIG. 15 is an end perspective view of an insert according to another example for receipt within the nozzle of FIG. 2 or the nozzle of FIG. 4.
Figure 16:
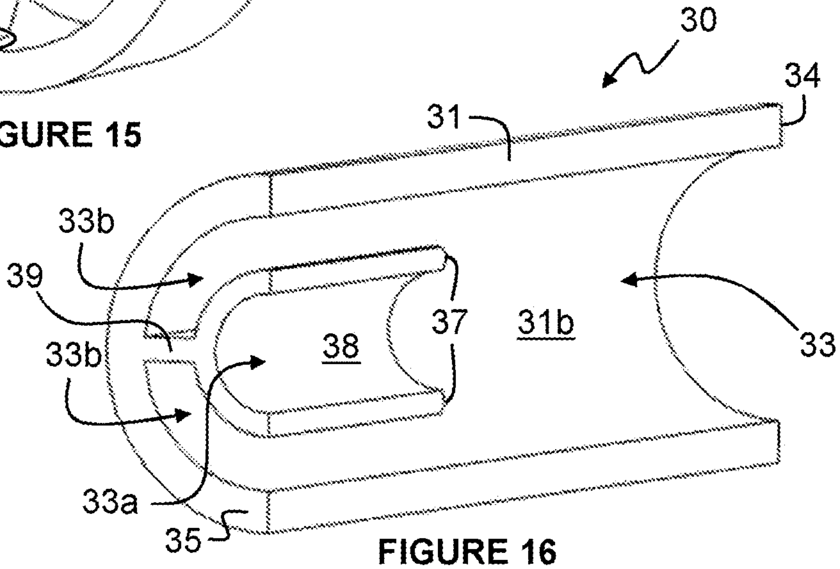
FIG. 16 is a cross-sectional perspective view of the insert of FIG. 9.

FIGS. 15 and 16 illustrate a heat transfer insert 30 according to another example, which is also configured to be press-fit into the body 101 of the nozzle 100 in place of the heat transfer inserts 10, 20 described above. The heat transfer insert 30 according to this example is similar to the heat transfer insert 10 first described above, wherein like references depict like features incremented by 20, which will not be described further.

The heat transfer insert 30 according to this example differs from the previous examples in that it incorporates a heat transfer element 32 including a tubular portion 38 and three radial fins 39 connecting the tubular portion 38 to the tubular wall 31 of the heat transfer insert 30.

The tubular portion 38 circumscribes a central region of the insert flow path 33 and the radial fins 39 are spaced equally about the circumference of the insert flow path 33.

The tubular portion 38 is coaxial with the tubular wall 31, thereby separating the flow path 33 into a core portion 33*a* and a segmented annular portion 33*b*, which is separated into three segments by the radial fins 39. As such, the surface area across which heat is transferred to the central region of the build material is increased even further than in the heat transfer insert 20 according to the second example. In addition, the skilled person will appreciate that the distribution of heat will also be improved with this arrangement.

In use, a filament of build material (not shown) is fed from a feed mechanism (not shown) into the insert flow path 33 via the lead-in 194 of the nozzle 100 and progresses in a similar manner to that which is described above in relation to the heat transfer insert 10 according to the first example.

Figure 17:
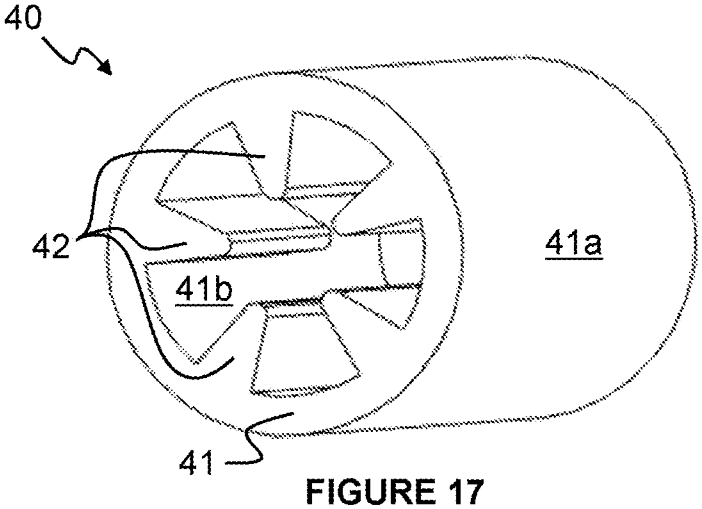
FIG. 17 is an end perspective view of an insert according to another example for receipt within the nozzle of FIG. 2 or the nozzle of FIG. 4.
Figure 18:
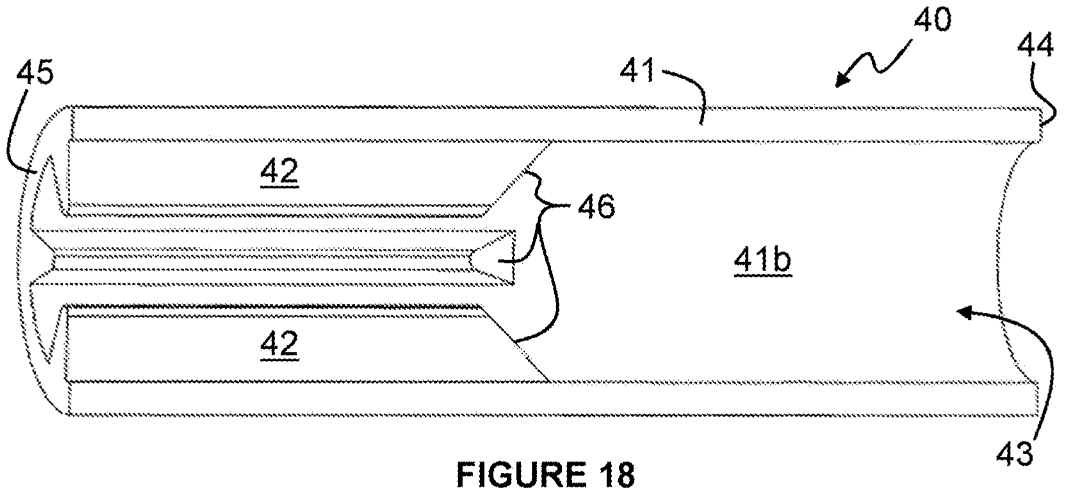
FIG. 18 is a cross-sectional perspective view of the insert of FIG. 11.

FIGS. 17 and 18 illustrate a heat transfer insert 40 according to another example, which is also configured to be press-fit into the body 101 of the nozzle 100 in place of the heat transfer inserts 10, 20, 30 described above. The heat transfer insert 40 according to this example is similar to the heat transfer insert 10 first described above, wherein like references depict like features incremented by 30, which will not be described further.

The heat transfer insert 40 according to this example differs from the previous examples in that it incorporates five heat transfer fins 42 spaced equally about the circumference of the insert flow path 43. Each heat transfer fin 42 tapers from the tubular wall 41 to a rounded apex spaced from the centreline C to form a flow path with a central core and five segment projecting radially therefrom, similar to a cinquefoil.

As such, the surface area across which heat is transferred to the central region of the build material is also substantial and the distribution of heat across the insert flow path 43 is also favourable in this arrangement.

In use, a filament of build material (not shown) is fed from a feed mechanism (not shown) into the insert flow path 43 via the lead-in 194 of the nozzle 100 and progresses in a similar manner to that which is described above in relation to the heat transfer insert 10 according to the first example.

Figure 19:
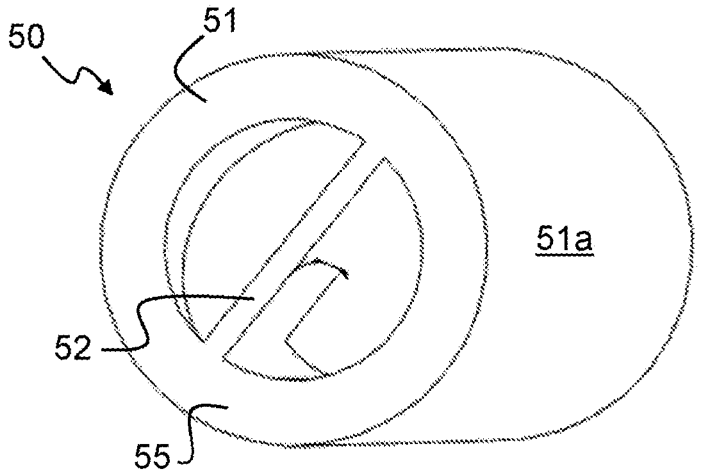
FIG. 19 is an end perspective view of an insert according to another example for receipt within the nozzle of FIG. 2 or the nozzle of FIG. 4.
Figure 20:
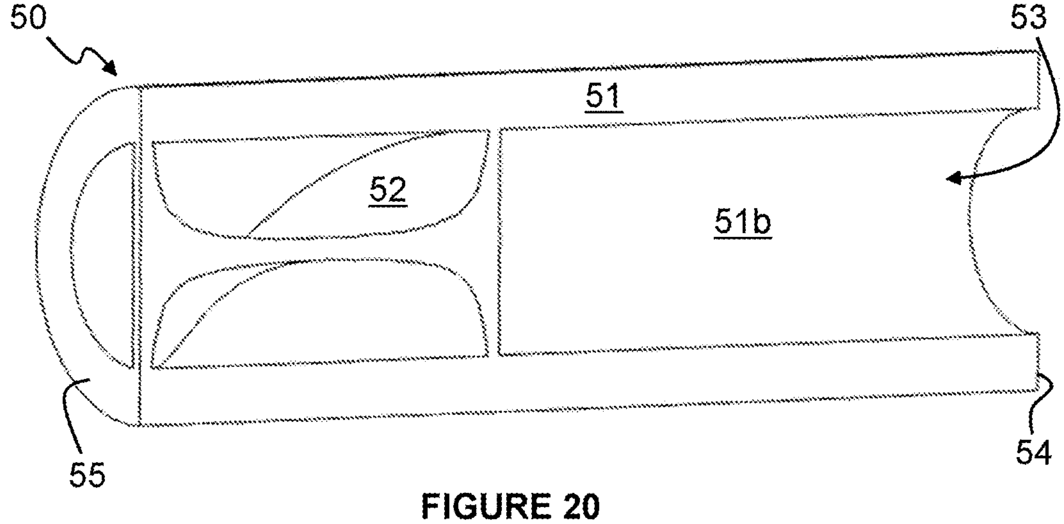
FIG. 20 is a cross-sectional perspective view of the insert of FIG. 13.

FIGS. 19 and 20 illustrate a heat transfer insert 50 according to another example, which is also configured to be press-fit into the body 101 of the nozzle 100 in place of the heat transfer inserts 10, 20, 30, 40 described above. The heat transfer insert 50 according to this example is similar to the heat transfer insert 10 first described above, wherein like references depict like features incremented by 40, which will not be described further.

The heat transfer insert 50 according to this example differs from the previous examples in that it incorporates a helical fin 52 spanning the flow path 53 and intersecting the centreline C. As such, not only is the surface area across which heat is transferred to the central region of the build material substantial, but the build material is forced to twist along a tortuous path. This is believed to introduce more shear in the semi-molten build material, improving further the distribution of heat across the flow path 53.

In use, a filament of build material (not shown) is fed from a feed mechanism (not shown) into the insert flow path 53 via the lead-in 194 of the nozzle 100 and progresses in a similar manner to that which is described above in relation to the insert 10 according to the first example.

Figure 21:
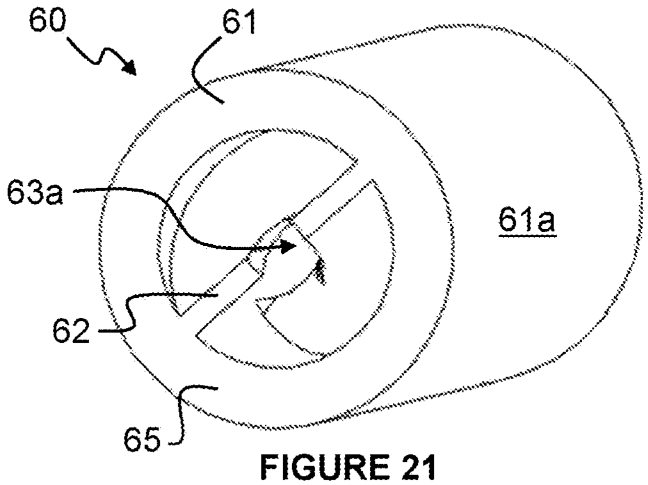
FIG. 21 is an end perspective view of an insert according to another example for receipt within the nozzle of FIG. 2 or the nozzle of FIG. 4.
Figure 22:
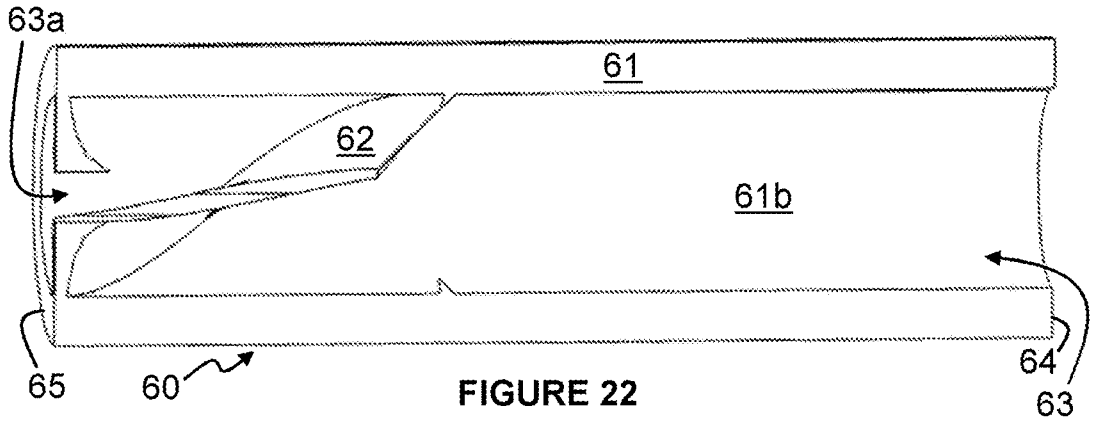
FIG. 22 is a cross-sectional perspective view of the insert of FIG. 15.

FIGS. 21 and 22 illustrate a heat transfer insert 60 according to another example, which is also configured to be press-fit into the body 101 of the nozzle 100 in place of the heat transfer inserts 10, 20, 30, 40, 50 described above. The heat transfer insert 60 according to this example is similar to the heat transfer insert 10 first described above, wherein like references depict like features incremented by 50, which will not be described further.

The heat transfer insert 60 according to this example differs from the heat transfer insert 50 described immediately above in that the helical fin 62 is formed of two separate section that terminate short of the centreline C. As a result, the flow path 63 is not split as in the previous example. Rather, provides a core flow portion 63*a* extends along the centreline C in the portion of the heat transfer insert 60 that includes the helical fin 62.

As such, not all of the build material is forced to twist along a tortuous path. This reduces the shear induced in the semi-molten build material, reducing the force necessary to advance the build material whilst still benefiting from the advantages associated with the aforementioned heat transfer insert 50.

In use, a filament of build material (not shown) is fed from a feed mechanism (not shown) into the insert flow path 63 via the lead-in 194 of the nozzle 100 and progresses in a similar manner to that which is described above in relation to the insert 10 according to the first example.

Figure 23:
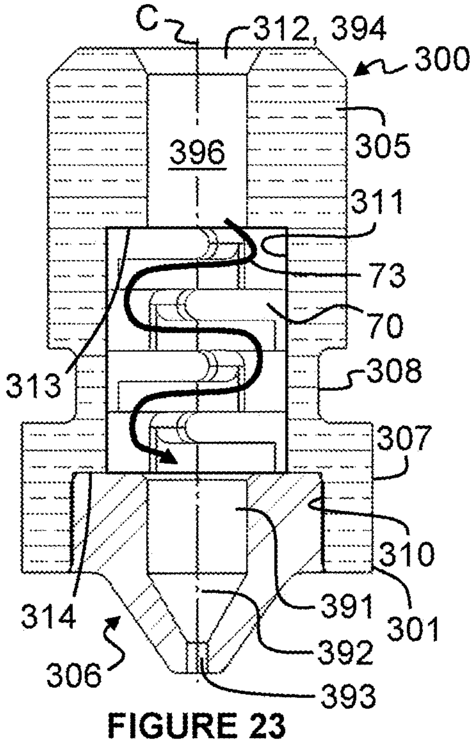
FIG. 23 is a cross-sectional view similar to FIGS. 2 and 4 showing a heat transfer insert according to another example received within another alternative nozzle body, which is retained by a tip insert.

Turning now to FIG. 23, there is shown an alternative nozzle 300 which is similar to the nozzles 100 of FIGS. 7 and 8, wherein like references depict like features incremented by 200. The nozzle 300 according to this example differs from that of the first example in that the heat transfer insert 70 is shorter, resulting in a straight inlet flow path 396 between the tapered lead-in 394 and the insert 70.

Figure 24:
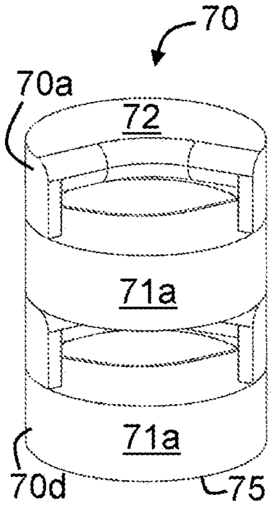
FIG. 24 is perspective view of the heat transfer insert shown in FIG. 17 shown from a first side.
Figure 25:
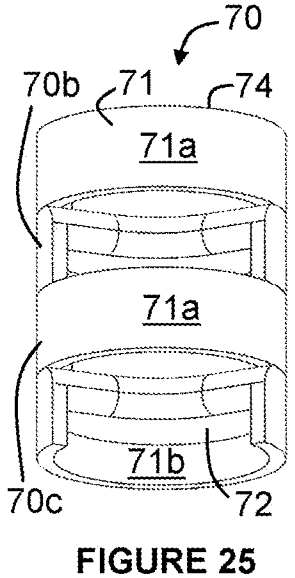
FIG. 25 is perspective view of the heat transfer insert shown in FIGS. 17 and 18 shown from a second side.

The heat transfer insert 70 according to this example is shown more clearly in FIGS. 24 and 25. As with the previous examples, this heat transfer insert 70 is configured to be press-fit into the heat transfer receiving portion 311 of the body 301 until it abuts the shoulder 313. The tip insert 306 is then press-fit into the tip insert receiving portion 310 of the body 301 to captivate the heat transfer insert 70 therein.

The heat transfer insert 70 according to this example differs from the heat transfer inserts 10, 20, 30, 40, 50, 60 described above in that it describes a meandering or stepped flow path 73, and is not split as in some of the previous examples. The heat transfer insert 70 is also provided by four segments 70*a*, 70*b*, 70*c*, 70*d*, each of which includes a part-tubular wall 71 with a crescent-shaped heat transfer element 72 at one of its axial ends. The heat transfer insert segments 70*a*, 70*b*, 70*c*, 70*d* are stacked with the gap in their part-tubular walls 71 alternating, thereby to provide the meandering or stepped flow path 73.

In use, a filament of build material (not shown) is fed from a feed mechanism (not shown) into the insert flow path 73 via the lead-in 394 and the inlet flow path 396 of the nozzle 300. The build material (not shown) progresses in a similar manner to that which is described above in relation to the insert 10 according to the first example.

Figure 26:
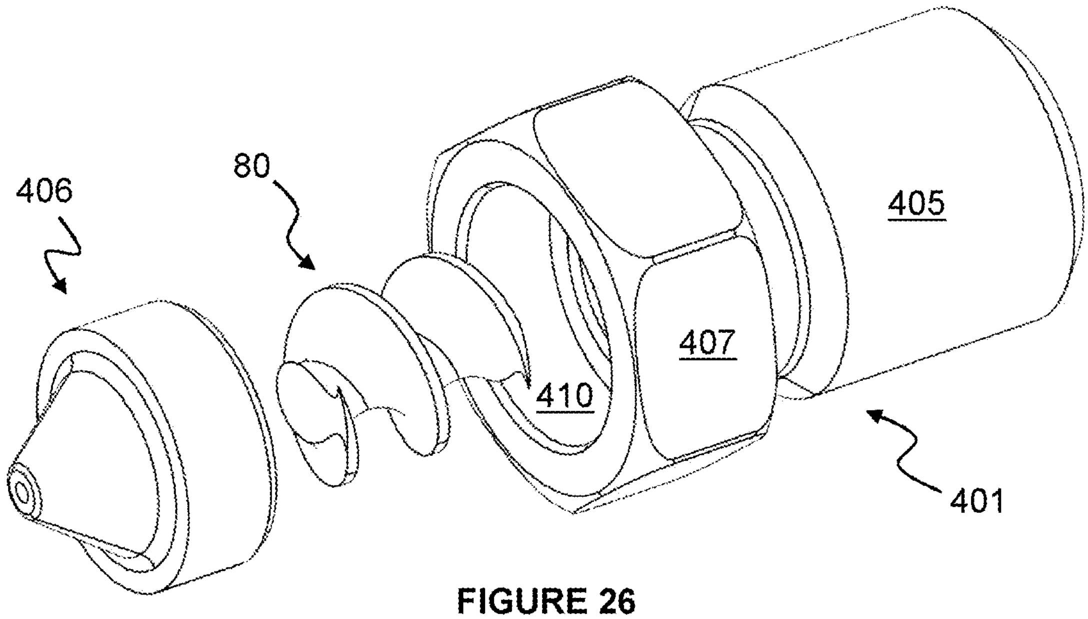
FIG. 26 is an exploded perspective view of a nozzle according to another example, similar to the nozzle of FIG. 17 with a heat transfer insert according to yet another example.
Figure 27:
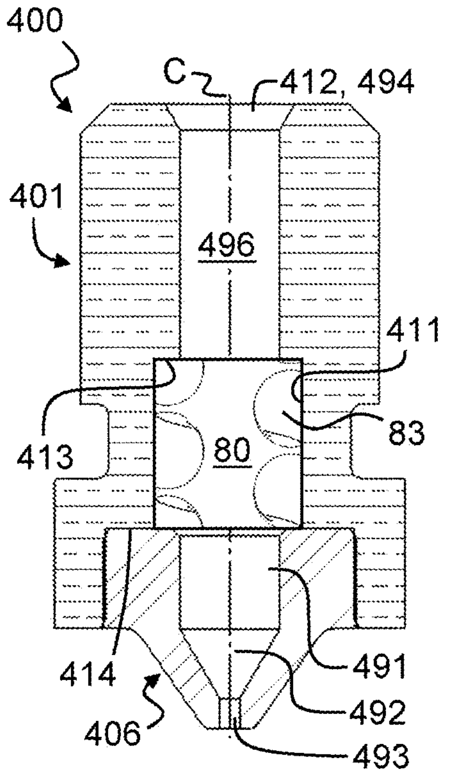
FIG. 27 is a cross-sectional view of the nozzle of FIG. 20.

FIGS. 26 and 27 show another nozzle 400, which is similar to the nozzle 300 of FIG. 23, wherein like references depict like features incremented by 100. The nozzle 400 according to this example differs from that of previous examples in that the heat transfer insert 80 is helical with no tubular or part-tubular wall 11, 21, 31, 41, 51, 61, 71.

Figure 28:
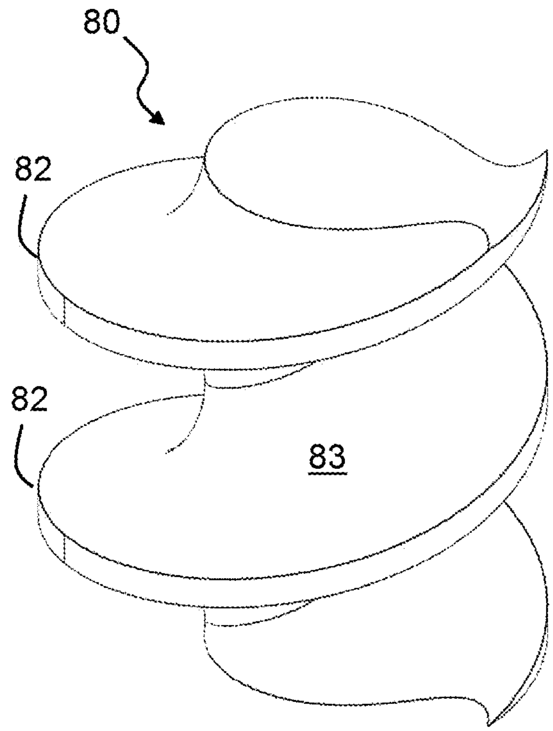
FIG. 28 is a perspective view of the heat transfer insert of the nozzles of FIGS. 20 and 21.

The heat transfer insert 80 according to this example is shown more clearly in FIG. 28. The heat transfer insert 80 according to this example is substantially cylindrical with a helical flow path 83 described between successive passes of a screw flight-shaped heat transfer element 82.

This heat transfer insert 80 is configured to be inserted into the heat transfer receiving portion 411 of the body 401 until it abuts the shoulder 413. Contrary to the previous examples, the heat transfer insert 80 according to this example is not press-fit into the body 401 of the nozzle 400. Whilst the heat transfer insert 80 preferably fits snugly within body 401, there need not be any interference therebetween (although such interference is envisaged without departing from the scope of the invention). The tip insert 406 is then press-fit into the tip insert receiving portion 410 of the body 401 to captivate the heat transfer insert 80 therein.

In use, a filament of build material (not shown) is fed from a feed mechanism (not shown) into the insert flow path 83 via the lead-in 494 and the inlet flow path 496 of the nozzle 400. The build material (not shown) progresses in a similar manner to that which is described above in relation to the insert 10 according to the first example.

Figure 29:
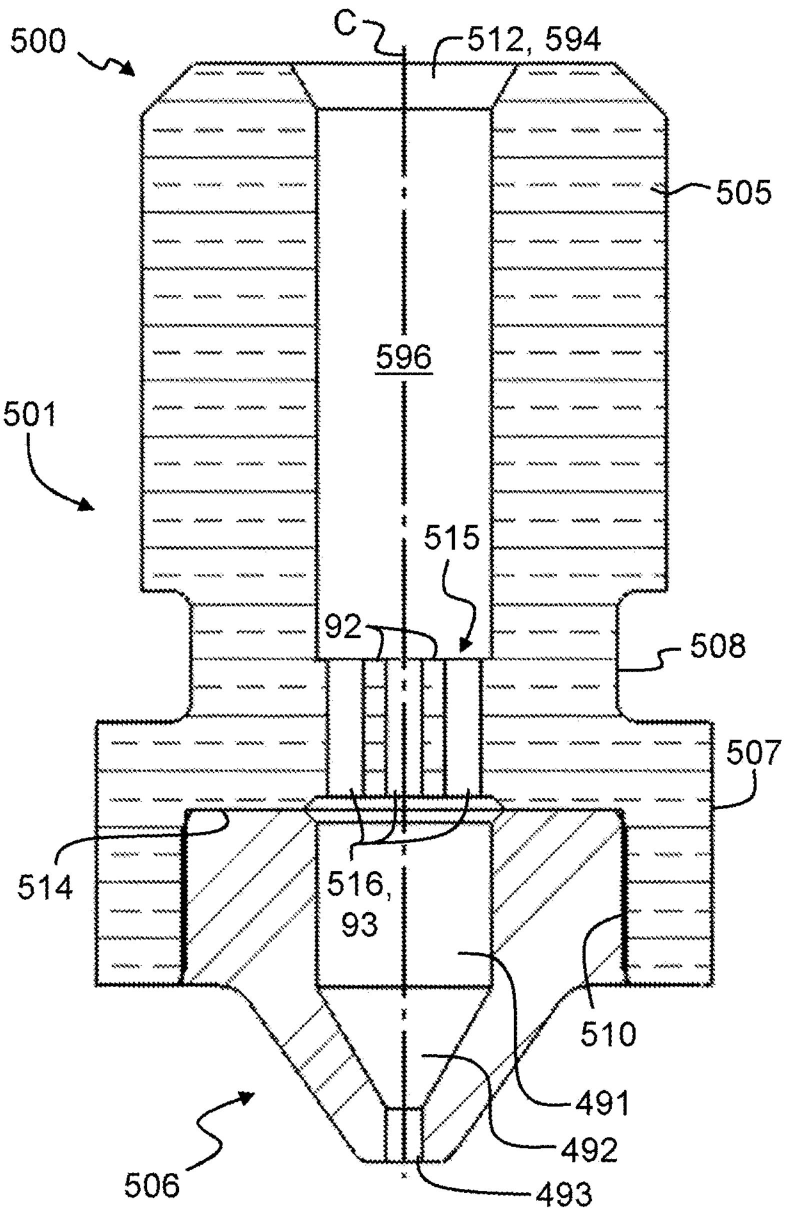
FIG. 29 is a cross-sectional view similar to FIGS. 2, 4, 17 and 21 showing a nozzle according to another example, in which the heat transfer elements are integral with the body, with a tip insert received with a receptacle of the body downstream of the heat transfer elements.

FIG. 29 shows another nozzle 500, which is similar to the first nozzle 100, wherein like references depict like features incremented by 400. The nozzle 500 according to this example differs from that of previous examples in that heat transfer elements 92 are formed integrally with the body 501, rather than being incorporated in a separate heat transfer insert 10, 20, 30, 40, 50, 60, 70, 80. Instead, a central portion 515 of the body 501 remains, with a heat transfer element flow path 93 being provided by a series of spaced holes 516 through the central portion 515.

The skilled person will appreciate that the use of a tip insert 506 enables the holes 516 to be drilled into the central portion 515, prior to insertion of the tip insert 506. This is advantageous for reasons that will be understood. As with previous examples, the tip insert 506 is press-fit into the tip insert receiving portion 510 of the body 501 until it abuts the shoulder 514.

In use, a filament of build material (not shown) is fed from a feed mechanism (not shown) into the insert flow path 93 via the lead-in 594 and the inlet flow path 596 of the nozzle 500. The build material (not shown) progresses in a similar manner to that which is described above in relation to the insert 10 according to the first example.

Figure 30:
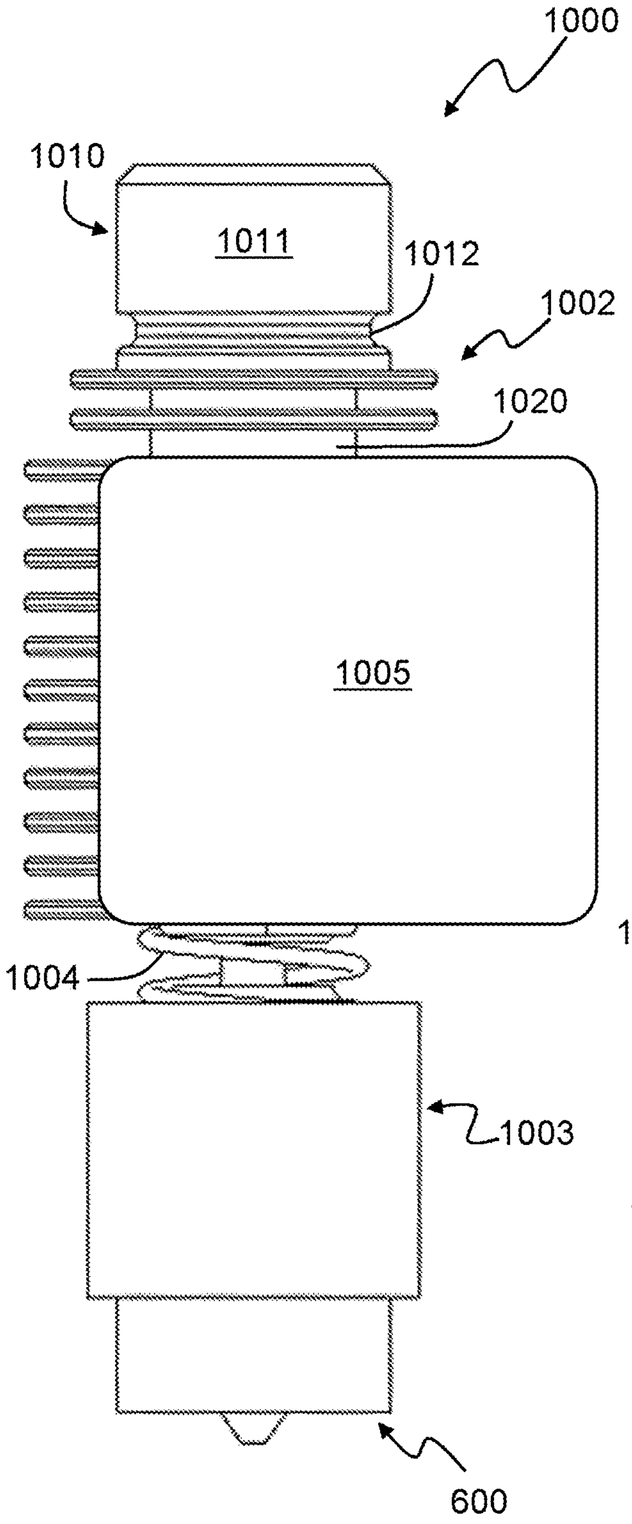
FIG. 30 is a side view of a liquefier assembly incorporating yet another alternative nozzle.
Figure 31:
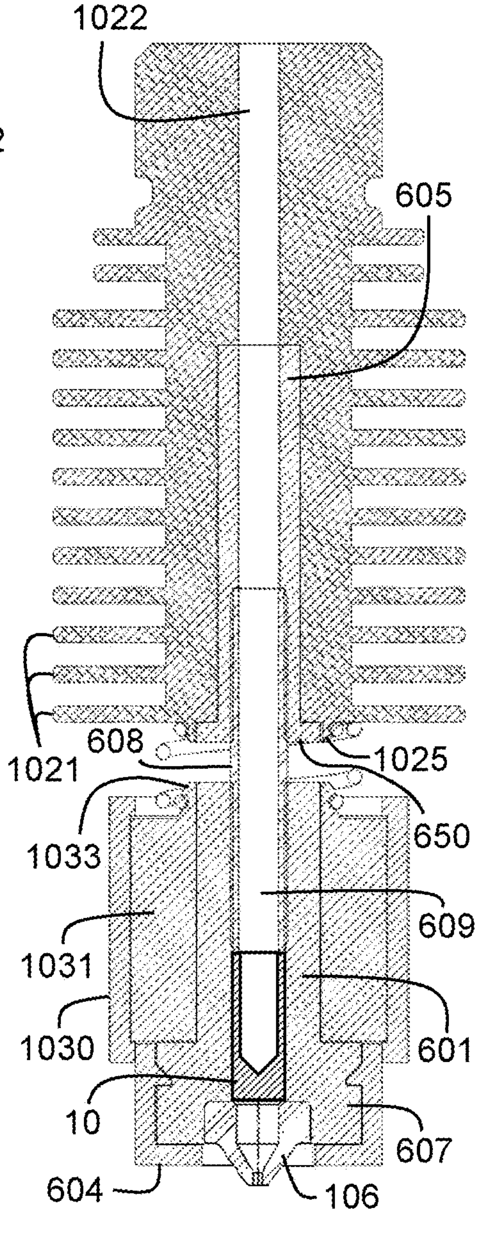
FIG. 31 is a cross-sectional view through the liquefier assembly, illustrating the first heat transfer insert received in the nozzle body and retained by a tip insert.

Referring now to FIGS. 30 and 31, there is shown a liquefier assembly 1000, which includes a heat sink 1002, a nozzle 600 releasably connected to the heat sink 1002, a ring heater 1003 biased against the nozzle 600 by a coil spring 1004 and a fan assembly 1005 mounted to the heat sink 1002. The liquefier assembly 1000 includes a connector 1010 at a first end of the heat sink 1002 for connection with a filament feed mechanism (not shown) of an additive manufacturing system (not shown), and is configured to facilitate replacement of the nozzle 600 in an unheated state. The connector 1010 is in the form of a head 1011 having a necked portion 1012.

The heat sink 1002 includes a substantially cylindrical core 1020 with a plurality of disc-shaped fins 1021 projecting radially from the core 1020 and a filament passageway 1022 extending axially through the centre of the core 1020 between its ends for receiving a filament from the filament feed mechanism (not shown). The passageway 1022 includes a smooth upstream portion, with a diameter that is slightly larger than the diameter of the filament (not shown) to be fed therethrough, and a downstream connection feature in the form of internal threads in this example. The heat sink 1002 also includes an engaging ring 1025 surrounding the downstream end of the passageway 1022 and projecting axially from the core 1020. The coil spring 1004 is retained on the engaging ring 2025 at the downstream end of the passageway 1022.

The nozzle 600 in this example includes a nozzle body 601, which includes a tip insert 106, as illustrated in FIG. 9, press-fitted within a head 607 of the nozzle body 601. The nozzle 600 also includes a connection sleeve 605, a liquefier tube 608 between the nozzle body 602 and the connection sleeve 605 and a tip cover 604 mounted over the head 607 the nozzle body 601. The connection sleeve 605 is threaded externally and has a radial flange 650 at a downstream end. The liquefier tube 608 has a substantially constant diameter and thickness and is received in an interference fit within the downstream end of the connection sleeve 605 and the upstream end of the nozzle body 601. The connection sleeve 605, nozzle body 601 and liquefier tube 608 collectively describe a filament passageway or flow path 609 through which a filament (not shown) is fed. In this example, the heat transfer insert 10 of FIGS. 11 and 12 is captivated between the tip insert 606 and the liquefier tube 608.

The ring heater 1003 includes a cylindrical cover 1030 that surrounds a heating sleeve 1031. The heating sleeve 1031 includes an engaging ring 1033 over which the coil spring 1004 is retained, thereby connecting the ring heater 1003 to the heat sink 1002. This connection between the ring heater 1003 and heat sink 1002 enables the ring heater 1003 to move freely relative to the heat sink 1002, such that the nozzle 600 may be misaligned when inserted into the heating sleeve 1031 of the ring heater 1003, and manipulated into engagement and proper alignment with the heat sink 1002 to enable the threads of the connection sleeve 605 to mesh with the threads of the downstream connection feature in of the passageway 1022.

Figure 32:
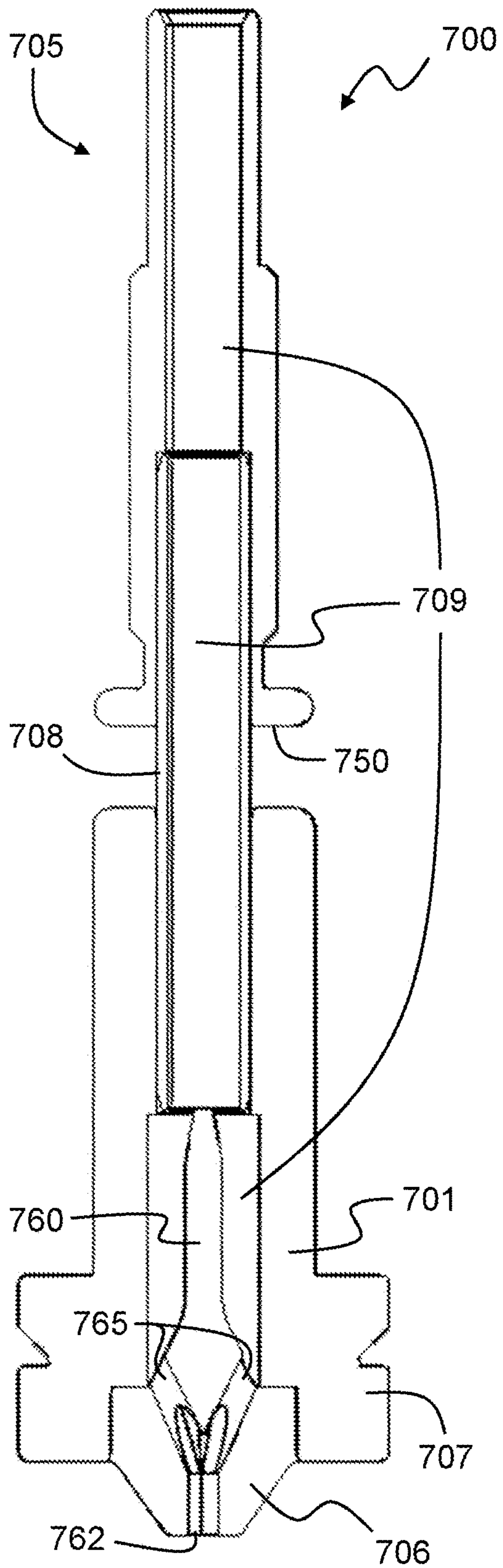
FIG. 32 is a cross-sectional view through yet another alternative nozzle for use in the liquefier assembly of FIG. 30, illustrating a tip insert incorporating heat transfer elements.

FIG. 32 shows an alternative nozzle 700, which is similar to the nozzle 600 of FIGS. 30 and 31, wherein like features will be denoted by like references incremented by '100'. The nozzle 700 in this example differs from that of FIGS. 30 and 31 in that the tip insert 706 incorporates a heat transfer element in the form of a rod or core 760 projecting from an upstream side of the insert 706 and into the filament passageway or flow path 709.

Figure 33:
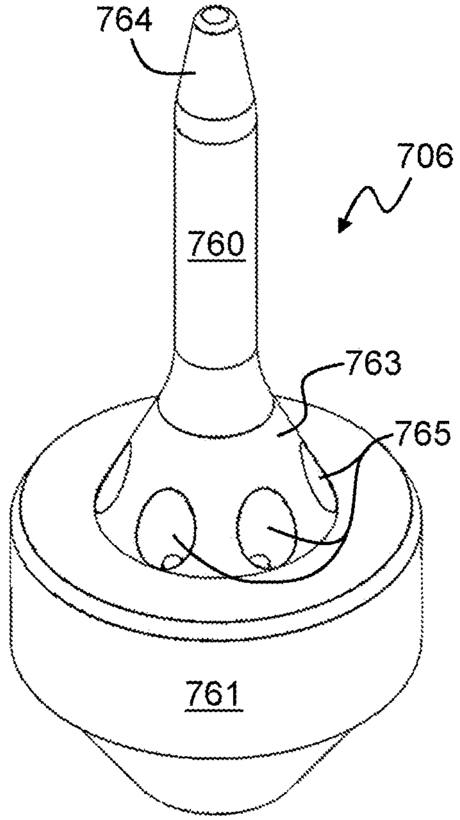
FIG. 33 is a perspective view of the tip insert of FIG. 32.

More specifically and as illustrated more clearly in FIG. 33, the insert 706 includes a cylindrical portion 761 that is press-fit into the receptacle in the head 707, a tapered downstream end describing an outlet passage 762 of the nozzle 706 and the heat transfer element or core 760 projecting from an upstream side of the cylindrical portion 761.

The core 760 is in the form of a solid rod joined to the cylindrical portion 761 of the insert 706 by a tapering portion 763 and terminating at a tapering tip 764. A series of holes or channels 765 circumscribe the core 760 and extend at an angle relative to the longitudinal axis of the nozzle 706 to join the outlet passage 762. With the insert 706 received within the head 707 of the nozzle body 701, the core 760 extends along the centre of the filament passageway 709, creating an annular portion of the filament passageway 709.

In use, build material fed into the filament passageway 709 is forced around the core 760 and through the annular portion of the filament passageway 709. The build material is then forced into the holes 765 before merging within the outlet passage 762 to be deposited on a build bed.

It will be appreciated by those skilled in the art that several variations to the aforementioned examples are envisaged without departing from the scope of the invention. For example, the heat transfer elements 12, 22, 32, 42, 52, 62, 72 may be formed separately from the tubular wall 11, 21, 31, 41, 51, 61, 71 and subsequently secured thereto. This could be achieved with slots in the tubular wall 11, 21, 31, 41, 51, 61, 71 that receive an outer portion of the heat transfer elements 12, 22, 32, 42, 52, 62, 72, which may then be mechanically secured (e.g. press-fit) or bonded (e.g. welded or brazed) to the tubular wall 11, 21, 31, 41, 51, 61, 71. Alternatively, the tubular wall 11, 21, 31, 41, 51, 61, 71 may be omitted and the heat transfer elements 12, 22, 32, 42, 52, 62, 72 could be formed integrally with the body 101 or secured to it mechanically or via bonding.

It will also be appreciated by those skilled in the art that any number of combinations of the aforementioned features and/or those shown in the appended drawings provide clear advantages over the prior art and are therefore within the scope of the invention described herein.

The invention claimed is:

1. A nozzle for an extrusion-based additive manufacturing system, the nozzle comprising:

a body surrounding a filament passageway;

a plurality of heat transfer fins secured in place and spaced about the periphery of the filament passageway to transfer heat to build material in the filament passageway, the plurality of heat transfer fins projecting into the filament passageway to define two or more flowpath segments for the build material; and a liquefier tube received in an interference fit within an upstream end of the nozzle body;

wherein the filament passageway comprises an inlet at an upstream end of the nozzle for receiving a solid filament of build material, an outlet at a downstream end of the nozzle through which molten build material exits the nozzle and a tapering portion between the inlet and the outlet in which the filament passageway narrows, the heat transfer fins being located between the inlet and the tapering portion and terminating upstream of the tapering portion and the tapering portion is defined by a surface free of any heat transfer fins.

2. The nozzle of claim 1, comprising a tip insert press-fitted within a head of the nozzle body and a heat transfer insert that includes the heat transfer fins, wherein the heat transfer insert is captivated between the tip insert and the liquefier tube.

3. The nozzle of claim 2, wherein the heat transfer insert comprises a tubular wall having an outer surface in thermal contact with the body, an inner surface describing at least part of the filament passageway and the heat transfer fins project from the inner surface.

4. The nozzle of claim 2, wherein the tip insert describes the tapering portion of the filament passageway.

5. The nozzle of claim 1, wherein the heat transfer fins form a flow path with a central core and a plurality of segments projecting radially therefrom.

6. The nozzle of claim 5, wherein the flow path formed by the heat transfer fins is substantially constant along at least part of its length.

7. The nozzle of claim 1, comprising a heat sink connected to an upstream end of the liquefier tube.

8. A liquefier assembly for an extrusion-based additive manufacturing system, the liquefier assembly comprising:

a filament passageway with an inlet at an upstream end of the liquefier assembly for receiving a solid filament of build material, an outlet at a downstream end of the liquefier assembly through which molten build material exits the liquefier assembly and a tapering portion between the inlet and the outlet in which the filament passageway narrows, a body surrounding the filament passageway; and a heat transfer insert secured within the body between the inlet and the tapering portion;

wherein the heat transfer insert comprises a plurality of heat transfer fins secured in place and spaced about the periphery of the filament passageway to transfer heat to build material in the filament passageway, the plurality of heat transfer fins projecting into the filament passageway to define two or more flowpath segments for the build material and terminating upstream of the tapering portion, and wherein the tapering portion is defined by a surface free of any heat transfer fins.

9. The liquefier assembly of claim 8, wherein the heat transfer fins form a flow path with a central core and a plurality of segments projecting radially therefrom.

10. The liquefier assembly of claim 9, wherein the flow path formed by the heat transfer fins is substantially constant along at least part of its length.

11. The liquefier assembly of claim 8, wherein the heat transfer insert comprises a tubular wall having an outer surface in thermal contact with the body, an inner surface describing at least part of the filament passageway and the heat transfer fins project from the inner surface.

12. The liquefier assembly of claim 8, comprising a liquefier tube connected to an upstream end of the body and a heat sink connected to an upstream end of the liquefier tube.

13. The liquefier assembly of claim 8, comprising a tip insert with a shoulder upstream of the outlet and the heat transfer insert abuts the shoulder.

14. A liquefier assembly for an extrusion-based additive manufacturing system, the liquefier assembly comprising:

a filament passageway with an inlet at an upstream end of the liquefier assembly for receiving a solid filament of build material, an outlet at a downstream end of the liquefier assembly through which molten build material exits the liquefier assembly and a tapering portion between the inlet and the outlet in which the filament passageway narrows, a body surrounding the filament passageway; and a plurality of heat transfer fins secured in place and projecting into the filament passageway between the inlet and the tapering portion to transfer heat to build material in the filament passageway and to define two or more flowpath segments for the build material;

wherein the heat transfer fins are spaced about the periphery of the filament passageway and terminate upstream of the tapering portion and the tapering portion is defined by a surface free of any heat transfer fins.

15. The liquefier assembly of claim 14, wherein the heat transfer fins form a flow path with a central core and five segments projecting radially therefrom.

16. The liquefier assembly of claim 15, wherein the flow path formed by the heat transfer fins is substantially constant along at least part of its length.

17. The liquefier assembly of claim 14, comprising a heat transfer insert secured within the body between the inlet and the tapering portion, wherein the heat transfer insert comprises the heat transfer fins.

18. The liquefier assembly of claim 17, wherein the heat transfer insert comprises a tubular wall having an outer surface in thermal contact with the body, an inner surface describing at least part of the filament passageway and the heat transfer fins project from the inner surface.

19. The liquefier assembly of claim 14, comprising a liquefier tube connected to an upstream end of the body and a heat sink connected to an upstream end of the liquefier tube.

20. The liquefier assembly of claim 17, comprising a liquefier tube connected to an upstream end of the body and a heat sink connected to an upstream end of the liquefier tube, wherein the heat transfer insert is captivated between the liquefier tube and a shoulder of a tip insert upstream of the outlet.

* * * * *